US012527662B2

(12) United States Patent
Paterson et al.

(10) Patent No.: US 12,527,662 B2
(45) Date of Patent: Jan. 20, 2026

(54) DEVICE AND METHOD FOR AUGMENTING MITRAL VALVE FUNCTION

(71) Applicant: Sydney Heart Valve Pty Ltd, Hunters Hill (AU)

(72) Inventors: Hugh Paterson, Sydney (AU); Paul Bannon, Sydney (AU); Michael Vallely, Melbourne (AU); Ashish Mitra, Sydney (AU)

(73) Assignee: Sydney Heart Valve Pty Ltd, Hunters Hill (AU)

( * ) Notice: Subject to any disclaimer, the term of this patent is extended or adjusted under 35 U.S.C. 154(b) by 0 days.

(21) Appl. No.: 18/821,094

(22) Filed: Aug. 30, 2024

(65) Prior Publication Data
US 2025/0127614 A1 Apr. 24, 2025

Related U.S. Application Data

(63) Continuation of application No. PCT/AU2023/050143, filed on Mar. 2, 2023.

(30) Foreign Application Priority Data

Mar. 3, 2022 (AU) .............................. 2022900505
Sep. 19, 2022 (AU) .............................. 2022902706

(51) Int. Cl.
*A61F 2/24* (2006.01)

(52) U.S. Cl.
CPC .......... *A61F 2/2418* (2013.01); *A61F 2/2409* (2013.01); *A61F 2220/0008* (2013.01);
(Continued)

(58) Field of Classification Search
CPC ................ A61F 2/2418; A61F 2/2409; A61F 2220/0008; A61F 2230/0034;
(Continued)

(56) References Cited

U.S. PATENT DOCUMENTS 8,034,104 B2 10/2011 Carpentier et al.
9,072,604 B1 * 7/2015 Melnick ................ A61F 2/2418
(Continued)

FOREIGN PATENT DOCUMENTS

WO WO-2023164749 A1 9/2023

OTHER PUBLICATIONS

Brunel, Laurencie et al. Splitting the anterior mitral leaflet impairs left ventricular function in an ovine model. European Journal of Cardio-Thoracic Surgery 63(1):ezac539, 1-10 (2022).
(Continued)

*Primary Examiner* — Suzette J Gherbi
(74) *Attorney, Agent, or Firm* — Wilson Sonsini Goodrich & Rosati

(57) ABSTRACT

Provided are devices and methods for augmenting mitral valve function. A cardiac valve prosthesis device comprises a stent frame assembly having an atrial portion and a ventricular portion, a peripheral ring attached to the stent frame assembly, which divides the stent frame assembly into the atrial and ventricular portions, and a plurality of valve leaflets fixedly coupled to the stent frame assembly. The peripheral ring fits over a native mitral valve annulus when the prosthesis device is implanted in a native mitral valve. The peripheral ring limits the protrusion of the stent frame assembly into a ventricular chamber and reduces the effect on ventricular outflow or excursion of a native leaflet by such protrusion.

61 Claims, 11 Drawing Sheets

(52) U.S. Cl.
CPC ........... *A61F 2230/0034* (2013.01); *A61F 2230/0069* (2013.01); *A61F 2250/0018* (2013.01); *A61F 2250/0037* (2013.01); *A61F 2250/0039* (2013.01)

(58) Field of Classification Search
CPC ...... A61F 2230/0069; A61F 2250/0018; A61F 2250/0037; A61F 2250/0039
See application file for complete search history.

(56) References Cited

U.S. PATENT DOCUMENTS

| | | | | |
|---|---|---|---|---|
| 2010/0312335 | A1* | 12/2010 | Kurian | A61F 2/2427 623/2.41 |
| 2011/0137397 | A1* | 6/2011 | Chau | A61F 2/2412 623/2.37 |
| 2011/0319989 | A1* | 12/2011 | Lane | A61F 2/2436 623/2.37 |
| 2014/0052237 | A1* | 2/2014 | Lane | A61F 2/2418 623/2.11 |
| 2014/0155997 | A1* | 6/2014 | Braido | A61F 2/2433 623/2.37 |
| 2014/0222141 | A1* | 8/2014 | Carpentier | A61F 2/2448 623/2.14 |
| 2014/0222144 | A1* | 8/2014 | Eberhardt | A61F 2/2418 623/2.38 |
| 2014/0277424 | A1* | 9/2014 | Oslund | A61F 2/2436 623/2.38 |
| 2016/0374801 | A1* | 12/2016 | Jimenez | A61F 2/2418 623/2.18 |
| 2018/0021129 | A1* | 1/2018 | Peterson | A61F 2/2412 623/2.17 |
| 2018/0147061 | A1* | 5/2018 | Drasler | A61F 2/2418 |
| 2019/0029828 | A1 | 1/2019 | Carpentier et al. | |
| 2020/0030092 | A1 | 1/2020 | Tuval et al. | |
| 2020/0100897 | A1 | 4/2020 | McLean et al. | |
| 2020/0306038 | A1 | 10/2020 | Cooper et al. | |
| 2021/0169467 | A1 | 6/2021 | Hacohen et al. | |
| 2021/0186691 | A1 | 6/2021 | Spence et al. | |
| 2025/0111930 | A1* | 4/2025 | Gérard | G16H 30/40 |

OTHER PUBLICATIONS

Goldstein, Daniel et al. Two-year outcomes of surgical treatment of severe ischemic mitral regurgitation. New England Journal of Medicine 374(4):344-353 (2016). Published Online Nov. 9, 2015.
PCT/AU2023/050143 International Search Report and Written Opinion dated Apr. 21, 2023.
Waggoner, Alan D. et al. Left ventricular outflow obstruction resulting from insertion of mitral prostheses leaving the native leaflets intact: adverse clinical outcome in seven patients. American heart journal 122(2):483-488 (1991).

* cited by examiner

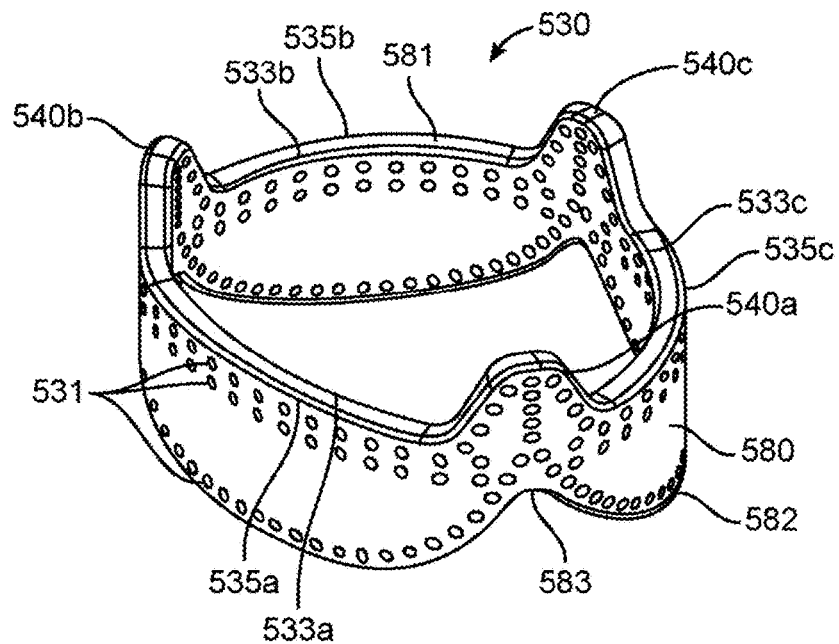
FIG. 5
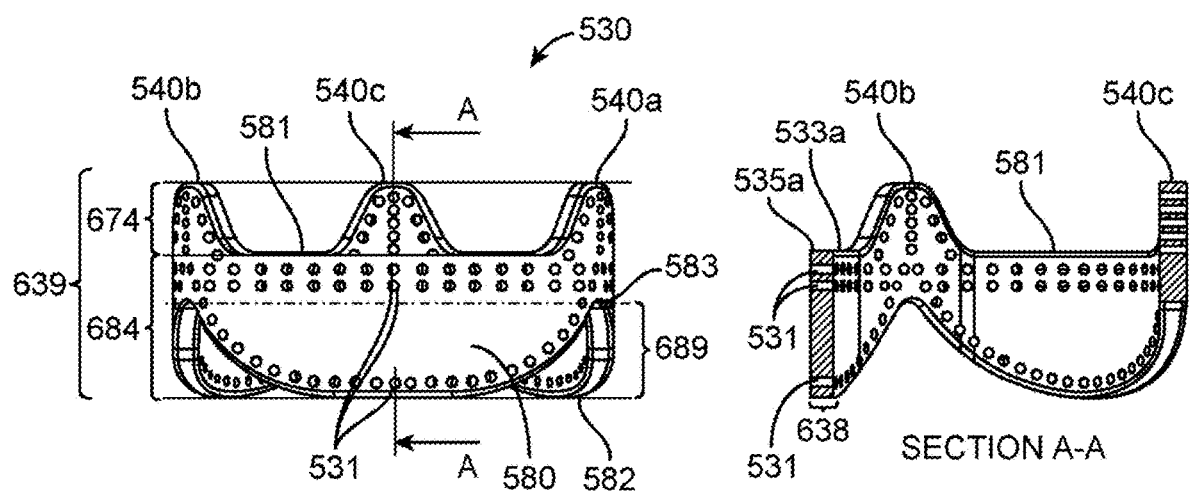
FIG. 6A                    FIG. 6B

DEVICE AND METHOD FOR AUGMENTING MITRAL VALVE FUNCTION

CROSS REFERENCE

This application is a continuation of International Application No. PCT/AU2023/050143, filed on Mar. 2, 2023, which claims the benefit of Australian Provisional Application No. 2022900505, filed on Mar. 3, 2022, and Australian Provisional Application No. 2022902706, filed on Sep. 19, 2022, each of which is incorporated herein by reference in its entirety.

BACKGROUND

The mitral valve is the inlet valve for the main pumping chamber of the heart, the left ventricle. The mitral valve has two leaflets, an anterior leaflet and a posterior leaflet, both of which contribute to left ventricular function by a force feedback loop system. The anterior mitral valve leaflet is the most important and supports left ventricular function by resisting the force of intra-ventricular pressure and transferring that force back through the left ventricular muscle to assist the pump function of the heart. Any modification of the anterior mitral leaflet substantially impairs left ventricular function and heart pump capability.

With currently available bioprosthesis, full retention of the anterior mitral leaflet at the time of mitral valve replacement risks left ventricular outflow tract (LVOT) obstruction due to abnormal displacement of the native anterior mitral leaflet by the bioprosthesis to below the aortic valve. LVOT obstruction is associated with a high mortality rate, so the current standard of care is to totally remove or substantially modify the anterior leaflet when valve replacement is performed. As noted above, however, removal or modification of the anterior leaflet can substantially impair left ventricular function and heart pump capability. Hence, improved mitral valve bioprosthesis are desired.

SUMMARY

The present disclosure relates to devices and methods for augmenting native cardiac valve function while accommodating full retention of a native cardiac valve leaflet without risk of ventricular outflow obstruction by the native cardiac valve leaflet. Aspects of the disclosure herein provide cardiac valve prosthesis devices. An exemplary device will typically comprise (i) a stent frame assembly, (ii) a peripheral ring, and (iii) a plurality of valve leaflets. The stent frame assembly has an atrial portion including an atria-facing superior end, a ventricular portion including a ventricular-facing inferior end, a height between the superior end and the inferior end, and a central opening traversing between the atrial and ventricular portions. The peripheral ring is attached to the stent frame assembly and surrounds the central opening. The peripheral ring is disposed between the atrial and ventricular portions. The peripheral ring has a ventricular-facing inferior-most surface configured to fit over a native mitral valve annulus when the prosthesis device is implanted in a native mitral valve. The plurality of valve leaflets is fixedly coupled to the stent frame assembly and positioned at the central opening of the stent frame assembly. The peripheral ring positions the stent frame assembly on the cardiac valve annulus to limit protrusion of the stent frame assembly into a ventricular chamber (e.g., the left ventricular chamber) and therefore reduce an effect on ventricular outflow or excursion of a native leaflet by such protrusion.

In some embodiments, the cardiac valve prosthesis device is a mitral valve prosthesis device. In some embodiments, the native cardiac valve annulus is a native mitral valve annulus. In some embodiments, the native cardiac valve is a native mitral valve. In some embodiments, the cardiac valve prosthesis device is a tricuspid valve prosthesis device. In some embodiments, the native cardiac valve annulus is a native tricuspid valve annulus and the native cardiac valve is a native tricuspid valve. In some embodiments, a ventricular length between the inferior-most surface of the peripheral ring and the inferior end of the stent frame assembly is less than 66% of the height between the inferior end and the superior end of the stent frame assembly. In some embodiments, a ventricular length between the inferior-most surface of the peripheral ring and the inferior end of the stent frame assembly is less than 50% of the height between the inferior end and the superior end of the stent frame assembly. In some embodiments, a ventricular length between the inferior-most surface of the peripheral ring and the inferior end of the stent frame assembly is less than 33% of the height between the inferior end and the superior end of the stent frame assembly. In some embodiments, a ventricular length between the inferior-most surface of the peripheral ring and the inferior end of the stent frame assembly is 8 mm or less. In some embodiments, a ventricular length between the inferior-most surface of the peripheral ring and the inferior end of the stent frame assembly is 5 mm or less. In some embodiments, the ventricular length is measured on an anterior side of the stent frame assembly. In some embodiments, an atrial length between the inferior-most surface of the peripheral ring and the superior end of the stent frame assembly is more than 33% of the height between the inferior end and the superior end of the stent frame assembly. In some embodiments, an atrial length between the inferior-most surface of the peripheral ring and the superior end of the stent frame assembly is more than 50% of the height between the inferior end and the superior end of the stent frame assembly. In some embodiments, an atrial length between the inferior-most surface of the peripheral ring and the superior end of the stent frame assembly is more than 66% of the height between the inferior end and the superior end of the stent frame assembly. In some embodiments, the height between the interior end and the superior end of the stent frame assembly is measured from an anterior side of the stent frame assembly. In some embodiments, each valve leaflet comprises a flexible membrane, and wherein the plurality of valve leaflets is configured to open in response to ventricular diastole and close in response to ventricular systole when the prosthesis device is implanted in the native mitral valve. In some embodiments, the plurality of valve leaflets is configured to permit blood flow from atrium to ventricle and restrict blood flow from a ventricular chamber to the atrial chamber when the prosthesis device is implanted in the native cardiac valve. In some embodiments, the plurality of valve leaflets is configured to coapt with one another in response to blood flow from a ventricular chamber to the atrial chamber when the prosthesis device is implanted in the native cardiac valve. In some embodiments, the plurality of valve leaflets is at least partially made of decellularized tissue or synthetic tissue. In some embodiments, the stent frame assembly comprises a stent frame and a covering disposed over the stent frame. In some embodiments, the covering comprises a fabric or pericardium tissue. In some embodiments, the stent frame assembly has a height between 12 mm and 20 mm. In some embodiments, the atrial portion has a height between 6 mm and 14 mm. In some embodiments, the ventricular portion has a height between 1.5 mm and 10 mm. In some embodiments, the peripheral ring is shaped to match a shape of the native mitral valve annulus so as to fit thereon when the prosthesis device is implanted in the native mitral valve. In some embodiments, the stent frame assembly has an antero-posterior diameter and a transverse diameter, the antero-posterior diameter being smaller than the transverse diameter. In some embodiments, the stent frame assembly has an anterior edge, a first posterior edge, and a second posterior edge, and wherein the anterior edge is one or more of flatter or longer than each of the first and second posterior edges. In some embodiments, the anterior edge, the first posterior edge, and the second posterior edge of the stent frame assembly are defined by the peripheral ring. In some embodiments, the stent frame assembly has an antero-posterior diameter between 20 mm and 34 mm. In some embodiments, the stent frame assembly has a transverse diameter between 25 mm and 39 mm. In some embodiments, the stent frame assembly is non-circular shaped. In some embodiments, the stent frame assembly is approximately D-shaped. In some embodiments, the peripheral ring is scalloped in the atrioventricular direction. In some embodiments, the peripheral ring is non-circular shaped. In some embodiments, the peripheral ring is approximately D-shaped. In some embodiments, peripheral edges of the stent frame assembly and the peripheral ring have the same shape. In some embodiments, the peripheral ring comprises a metal wire to help with visualization of the cardiac valve prosthesis device under imaging. In some embodiments, the peripheral ring comprises an anterior edge, a first posterior edge, and a second posterior edge, each sized and shaped to match complementary portions of the native valve annulus. In some embodiments, the peripheral ring further comprises a first anterior corner, a second anterior corner, and a posterior corner, wherein the anterior edge is positioned between the first and second anterior corners, wherein the first posterior edge is positioned between the second anterior corner and the posterior corner, and wherein the second posterior edge is positioned between the posterior corner and the first anterior corner. In some embodiments, the anterior edge is one or more of flatter or longer than each of the first and second posterior edges. In some embodiments, the plurality of valve leaflets comprises an anterior valve leaflet fixedly attached to the stent frame assembly adjacent to the anterior edge of the peripheral ring. In some embodiments, the plurality of valve leaflets comprises a first posterior valve leaflet fixedly attached to the stent frame assembly adjacent the first posterior edge of the peripheral ring and a second posterior valve leaflet fixedly attached to the stent frame assembly adjacent the second posterior edge of the peripheral ring. In some embodiments, the stent frame assembly comprises an asymmetric cylinder and a plurality of ventricular posts extending therefrom. In some embodiments, the peripheral ring further comprises a first anterior corner, a second anterior corner, and a posterior corner, and wherein the plurality of ventricular posts comprises a first anterior post positioned at the first anterior corner, a second anterior post positioned at the second anterior corner, and a posterior post positioned at the posterior corner. In some embodiments, the atrial end of the stent frame assembly is scalloped. In some embodiments, the ventricular end of the stent frame assembly is scalloped. In some embodiments, the peripheral ring is a sewing ring. In some embodiments, the peripheral ring is flexible in the plane of the native cardiac valve annulus. In some embodiments, the peripheral ring is more flexible in the plane of the native cardiac valve annulus than in a plane transverse to the plane of the native cardiac valve annulus. In some embodiments, the plurality of valve leaflets comprises an anterior valve leaflet, a first posterior valve leaflet, and a second posterior valve leaflet, each comprising fixed edges coupled to the stent frame assembly and free edges. In some embodiments, the anterior valve leaflet is larger than each of the first and second posterior valve leaflets. In some embodiments, the stent frame assembly comprises a plurality of ventricular posts, the plurality of ventricular posts comprising a first anterior post, a second anterior post, and a posterior post. In some embodiments, the fixed edge of the anterior valve leaflet is supported by the first and second anterior posts, and wherein a distance between the first and second anterior posts is greater than distances between each anterior post and the posterior post. In some embodiments, an angle along the free edge of the anterior valve leaflet is greater than each angle along the free edge of the first posterior valve leaflet and each angle along the free edge of the second posterior valve leaflet. In some embodiments, the plurality of valve leaflets is arranged to define a first anterior commissure between adjacent free edges of the anterior valve leaflet and the first posterior valve leaflet, a second anterior commissure between adjacent free edges of the anterior valve leaflet and the second posterior valve leaflet, and a posterior commissure between adjacent free edges of the first and second posterior valve leaflets. In some embodiments, the cardiac valve prosthesis device is configured to augment the native cardiac valve.

Aspects of the disclosure herein also provide methods of treating a dysfunction of a cardiac valve. An exemplary method will typically comprise implanting a stent frame assembly of a cardiac valve prosthesis device in a native cardiac valve of a heart such that a ventricular-facing, inferior-most surface of a peripheral ring coupled to the stent frame assembly fits over an annulus of the native cardiac valve. The peripheral ring separates the stent frame assembly into an atrial portion and a ventricular portion. The peripheral ring limits protrusion of the stent frame assembly into a ventricular chamber (e.g., the left ventricular chamber) to reduce an effect on ventricular outflow or excursion of a native leaflet by such protrusion.

In some embodiments, the cardiac valve is a mitral valve. In some embodiments, the cardiac valve prosthesis device is a mitral valve prosthesis device. In some embodiments, the native cardiac valve is a native mitral valve. In some embodiments, the cardiac valve prosthesis device is a tricuspid valve prosthesis device. In some embodiments, the native cardiac valve annulus is a native tricuspid valve annulus and the native cardiac valve is a native tricuspid valve. In some embodiments, a ventricular length between the inferior-most surface of the peripheral ring and the inferior end of the stent frame assembly is less than 66% of the height between the inferior end and the superior end of the stent frame assembly. In some embodiments, a ventricular length between the inferior-most surface of the peripheral ring and the inferior end of the stent frame assembly is less than 50% of the height between the inferior end and the superior end of the stent frame assembly. In some embodiments, a ventricular length between the inferior-most surface of the peripheral ring and the inferior end of the stent frame assembly is less than 33% of the height between the inferior end and the superior end of the stent frame assembly. In some embodiments, a ventricular length between the inferior-most surface of the peripheral ring and the inferior end of the stent frame assembly is 8 mm or less. In some embodiments, a ventricular length between the inferior-most surface of the peripheral ring and the inferior end of the stent frame assembly is 5 mm or less. In some embodiments, the ventricular length is measured on an anterior side of the stent frame assembly. In some embodiments, an atrial length between the inferior-most surface of the peripheral ring and the superior end of the stent frame assembly is more than 33% of the height between the inferior end and the superior end of the stent frame assembly. In some embodiments, an atrial length between the inferior-most surface of the peripheral ring and the superior end of the stent frame assembly is more than 50% of the height between the inferior end and the superior end of the stent frame assembly. In some embodiments, an atrial length between the inferior-most surface of the peripheral ring and the superior end of the stent frame assembly is more than 66% of the height between the inferior end and the superior end of the stent frame assembly. In some embodiments, the height between the interior end and the superior end of the stent frame assembly is measured from an anterior side of the stent frame assembly. In some embodiments, the cardiac valve prosthesis device is configured to augment the native cardiac valve. In some embodiments, the stent frame assembly is implanted in the native cardiac valve annulus with the native anterior cardiac valve leaflet being preserved. In some embodiments, the stent frame assembly is implanted in the native cardiac valve annulus with the native anterior cardiac valve leaflet not having been excised or remodeled. In some embodiments, the stent frame assembly is implanted in the native cardiac valve annulus with substantially no change in an anatomical position of the native anterior cardiac valve leaflet. In some embodiments, implanting the stent frame assembly in the native cardiac valve comprises positioning the stent frame assembly and a plurality of valve leaflets coupled thereto such that a native anterior leaflet of the cardiac valve is unobstructed from at least partially occupying the annulus of the native cardiac valve during ventricular systole. In some embodiments, each valve leaflet comprises a flexible membrane, and wherein the plurality of valve leaflets is configured to open in response to ventricular diastole and close in response to ventricular systole when the prosthesis device is implanted in the native cardiac valve. In some embodiments, the plurality of valve leaflets is configured to permit blood flow from atrium to ventricle and restrict blood flow from a ventricular chamber to the atrial chamber when the prosthesis device is implanted in the native cardiac valve. In some embodiments, the plurality of valve leaflets is configured to coapt with one another in response to blood flow from a ventricular chamber to the atrial chamber when the prosthesis device is implanted in the native cardiac valve. In some embodiments, the plurality of valve leaflets comprises an anterior valve leaflet, a first posterior valve leaflet, and a second posterior valve leaflet, each comprising fixed edges coupled to the stent frame assembly and free edges. In some embodiments, the anterior valve leaflet is larger than each of the first and second posterior valve leaflets. In some embodiments, the stent frame assembly comprises a plurality of ventricular posts, the plurality of ventricular posts comprising a first anterior post, a second anterior post, and a posterior post. In some embodiments, the fixed edge of the anterior valve leaflet is supported by the first and second anterior posts, and wherein a distance between the first and second anterior posts is greater than distances between each anterior post and the posterior post. In some embodiments, the stent frame assembly comprises a stent frame and a covering disposed over the stent frame. In some embodiments, the peripheral ring is shaped to match a shape of the native cardiac valve annulus so as to fit thereon when the cardiac valve prosthesis device is implanted in the native cardiac valve. In some embodiments, the stent frame assembly has an antero-posterior diameter and a horizontal diameter, the antero-posterior diameter being smaller than the horizontal diameter. In some embodiments, the stent frame assembly has an anterior edge, a first posterior edge, and a second posterior edge, and wherein the first posterior edge is one or more of flatter or longer than each of the first and second posterior edges. In some embodiments, the anterior edge, the first posterior edge, and the second posterior edge of the stent frame assembly are defined by the peripheral ring. In some embodiments, the stent frame assembly is non-circular shaped. In some embodiments, the stent frame assembly is approximately D-shaped. In some embodiments, the peripheral ring is non-circular shaped. In some embodiments, the peripheral ring is approximately D-shaped. In some embodiments, the peripheral ring is scalloped in the atrioventricular direction. In some embodiments, peripheral edges of the stent frame assembly and the peripheral ring have the same shape. In some embodiments, the stent frame assembly comprises an asymmetric cylinder and a plurality of ventricular posts extending therefrom. In some embodiments, the atrial end of the stent frame assembly is scalloped. In some embodiments, the ventricular end of the stent frame assembly is scalloped. In some embodiments, the peripheral ring is a sewing ring. In some embodiments, the peripheral ring is flexible in the plane of the cardiac annulus. In some embodiments, the peripheral ring is more flexible in the plane of the native cardiac valve annulus than in a plane transverse to the plane of the native cardiac valve annulus.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative embodiments, in which the principles of the present disclosure are utilized, and the accompanying drawings of which:

FIG. 5 is a perspective view of a stent frame of an exemplary mitral valve prosthesis device of the present disclosure;

FIGS. 6A-6B are an elevational and cross-sectional view, respectively, of the stent frame of FIG. 5;

DETAILED DESCRIPTION

Figure 1:
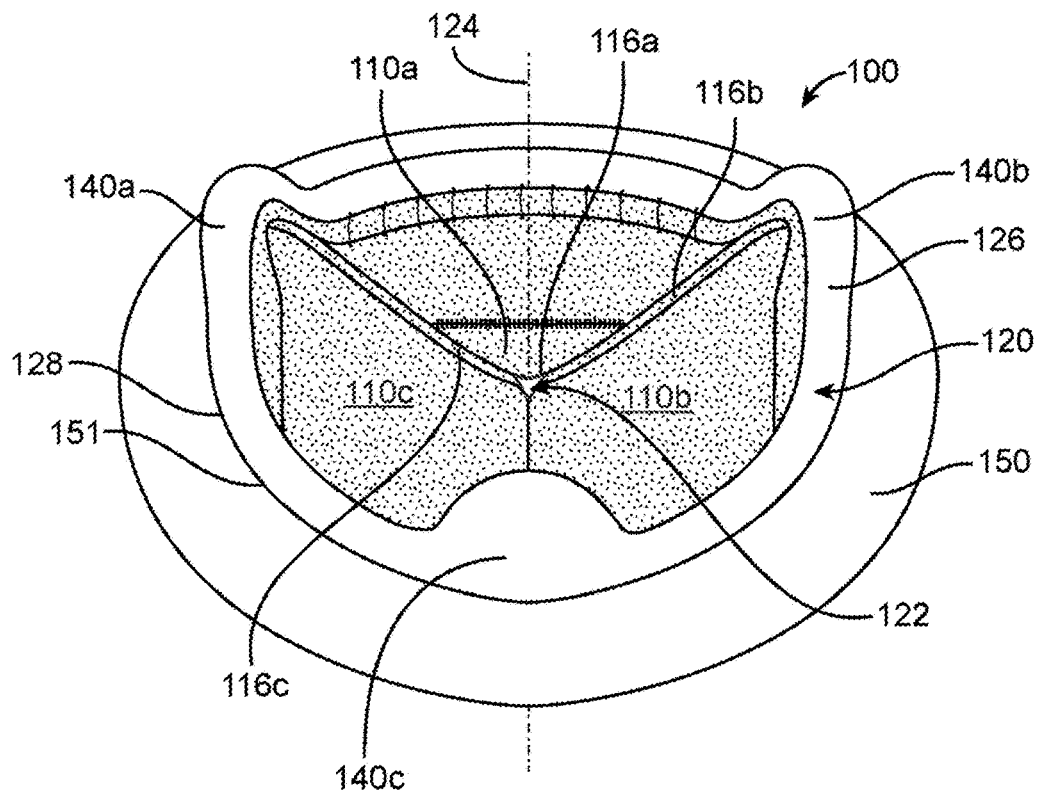
FIG. 1 is a perspective view of a ventricular end of an exemplary mitral valve prosthesis device of the present disclosure, the ventricular end being configured to protrude into a ventricular chamber.

Unless defined otherwise, all terms of art, notations and other technical and scientific terms or terminology used herein are intended to have the same meaning as is commonly understood by one of ordinary skill in the art to which the claimed subject matter pertains. In some embodiments, terms with commonly understood meanings are defined herein for clarity and/or for ready reference, and the inclusion of such definitions herein should not necessarily be construed to represent a substantial difference over what is generally understood in the art.

Throughout this application, various embodiments can be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

As used herein, the term 'about', in reference to a number, refers to the number plus or minus 20% of the number. The term 'about', in reference to a range, refers to the range minus 20% of its lowest value and plus 20% of its greatest value.

As used herein, the singular forms "a", "an" and "the" include plural references unless the context clearly dictates otherwise. For example, the term "a sample" includes a plurality of samples, including mixtures thereof.

As used herein, the term "approximately D-shaped" means that the approximately straight side of a "D" shape is an arc with a radius of curvature substantially (e.g., at least 1.1 times) greater than the radius of curvature of the arc of the "D". In some embodiments, the "D" shape is symmetrical about an Anterior-Posterior midline axis. In some embodiments, "D" shape is asymmetrical about a Transverse midline axis.

As used herein, the terms "atrialisation" or "achieving atrialisation" refer to reducing a protrusion of a mitral valve prosthesis device into a ventricular chamber of a heart, thereby causing a reduced effect on ventricular outflow or excursion of a native leaflet by such protrusion, including displacement of the native anterior mitral leaflet to obstruct the left ventricular outflow track. In some embodiments, the mitral valve prosthesis device has a stent frame assembly comprising a plurality of ventricular posts configured to protrude into the ventricular chamber of the heart. As used herein, the terms "atrialisation" or "achieving atrialisation" also refer to reducing a protrusion of the plurality of ventricular posts into the ventricular chamber, thereby causing a reduced effect on ventricular outflow or excursion of a native leaflet by such protrusion. In some embodiments, "atrialisation" of the prosthesis device also enables full excursion of a native valve leaflet (e.g., a native anterior mitral leaflet), thereby preserving function of the native valve leaflet (e.g., anterior mitral leaflet movement and associated valvular-ventricular interactions).

With currently available bioprosthesis for mitral valve replacement, full retention of the native anterior mitral leaflet (AML) at the time of mitral valve replacement risks left ventricular outflow tract (LVOT) obstruction due to abnormal displacement of the native AML to below the aortic valve. Displacement of the native AML occurs when an implanted bioprosthesis protrudes too far through the native mitral valve and protrudes into the ventricular chamber and limits the full excursion of the native AML. However, aspects of the present disclosure provide a mitral valve prosthesis device that exhibits reduced protrusion into the ventricular chamber and would not cause the native AML to obstruct the LVOT, even if the native AML is not resected when the prosthesis device is implanted in the native mitral valve. In some embodiments, the mitral valve prosthesis device of the present disclosure is configured to augment rather than replace a native mitral valve.

Figure 2:
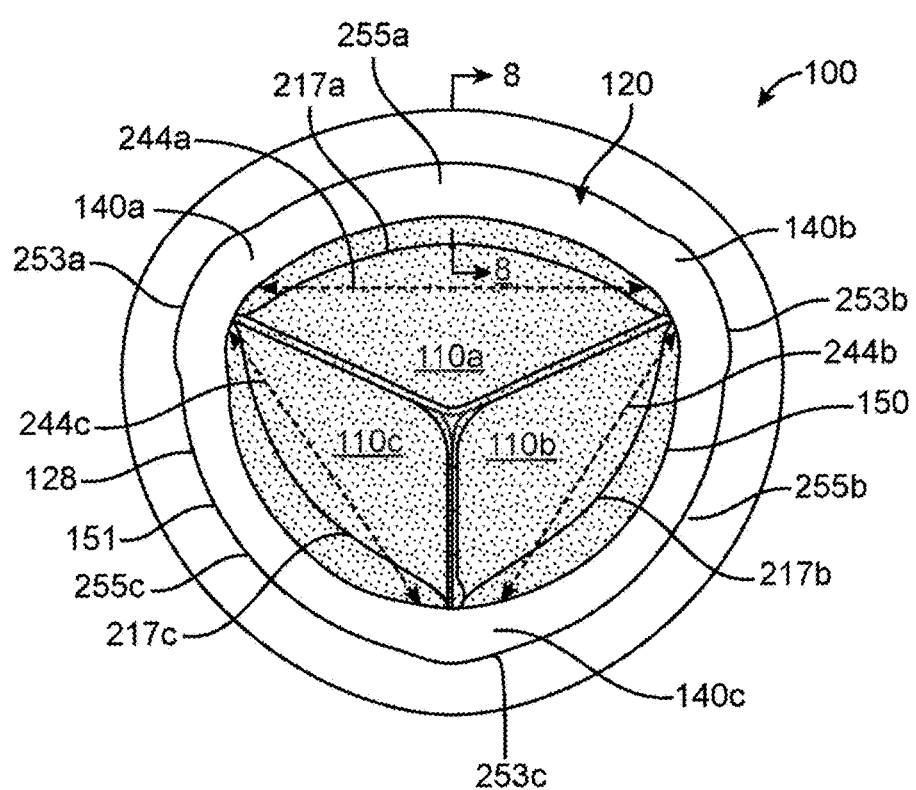
FIG. 2 is a topic plane view of the mitral valve prosthesis device of FIG. 1.

With reference to FIGS. 1-4, an exemplary mitral valve prosthesis device 100 of the present disclosure is shown in various views. The mitral valve prosthesis device 100 has two ends, an atrial end configured to protrude into an atrial chamber of a heart and a ventricular end configured to protrude into a ventricular chamber of the heart when the prosthesis device 100 is implanted in a native mitral valve of the heart. FIGS. 1-2 are a perspective view and a topic plane view, respectively, depicting the ventricular end of the mitral valve prosthesis device 100 configured to protrude into the ventricular chamber of the heart. In some embodiments, the mitral valve prosthesis device 100 comprises a plurality of valve leaflets 110a, 110b, 110c fixedly coupled to a stent frame assembly 120, wherein the plurality of valve leaflets project inwardly therefrom to occupy a central opening 122 of the stent frame assembly 120. Each valve leaflet has a free edge 116a, 116b, and 116c positioned adjacent to one another, wherein the free edges are not fixedly coupled to the stent frame assembly 120. A central flow axis 124 runs through the central opening 122.

In some embodiments, the plurality of valve leaflets augment, support, or improve the function of the native mitral valve when the prosthesis device 100 is implanted in the native mitral valve. In some embodiments, the plurality of valve leaflets is configured to open in response to ventricular diastole and close in response to ventricular systole when the prosthesis device is implanted in the native mitral valve. In some embodiments, the plurality of valve leaflets is configured to permit blood flow from the atrial chamber to the ventricular chamber when the prosthesis device is implanted in the native mitral valve. In some embodiments, the plurality of valve leaflets is configured to restrict blood flow from the ventricular chamber to the atrial chamber when the prosthesis device is implanted in the native mitral valve. In some embodiments, the plurality of valve leaflets is configured to coapt with one another in response to blood flow from the ventricular chamber to the atrial chamber when the prosthesis device is implanted in the native mitral valve. In some embodiments, each valve leaflet of the plurality of valve leaflets has a flexible membrane. In some embodiments, each valve leaflet of the plurality of valve leaflets is at least partially made of decellularized tissue or synthetic tissue. In some embodiments, each valve leaflet of the plurality of valve leaflets is made of a bioengineered material or a fixed tissue (e.g., bovine or porcine pericardium) in glutaraldehyde. In some embodiments, each valve leaflet of the plurality of valve leaflets is made of a bovine or porcine pericardium. In some embodiments, each valve leaflet of the plurality of valve leaflets is made of a synthetic polymer (e.g., polyurethane, synthetic resins, thermoplastic elastomers). In some embodiments, each leaflet of the plurality of valve leaflets is coated with an anti-thrombogenic agent. In some embodiments, each leaflet of the plurality of valve leaflets is coated with an anti-calcification agent. In some embodiments, each leaflet of the plurality of valve leaflets has anti-thrombogenic properties, anti-calcification properties, or any combination thereof.

Stent Frame Assembly

The mitral valve prosthesis device 100 comprises a stent frame assembly 120, wherein the stent frame assembly includes a covering 126 surrounding a stent frame. In some embodiments, the covering 126 comprises an inner skirt and an outer skirt, wherein the inner and outer skirts are attached or sewn to the stent frame.

The stent frame assembly 120 has two ends, an atrial end configured to protrude into an atrial chamber of a heart and a ventricular end configured to protrude into a ventricular chamber of the heart when the prosthesis device 100 is implanted in a native mitral valve of the heart. In some embodiments, the atrial end of the stent frame assembly 120 is scalloped. In some embodiments, the ventricular end of the stent frame assembly 120 is scalloped.

In some embodiments, the stent frame assembly 120 is non-circular shaped. In some embodiments, the stent frame assembly 120 is approximately D-shaped (i.e., the approximately straight side of a "D" shape is an arc with a radius of curvature substantially greater than the radius of curvature of the arc of the "D"). In some embodiments, the shape of the stent frame assembly 120 is symmetrical about an Anterior-Posterior midline axis. In some embodiments, the shape of the stent frame assembly 120 is asymmetrical about a Transverse midline axis. In some embodiments, the stent frame assembly has a peripheral edge 128. In some embodiments, the shape of the peripheral edge 128 is non-circular. In some embodiments, the shape of the peripheral edge 128 is approximately D-shaped. In some embodiments, the shape of the peripheral edge 128 is symmetrical about an Anterior-Posterior midline axis. In some embodiments, the shape of the peripheral edge 128 is asymmetrical about a Transverse midline axis.

Ventricular Posts

In some embodiments, the stent frame assembly 120 has a plurality of ventricular posts 140a, 140b, 140c. Each ventricular post has a ventricular-facing inferior end configured to protrude into the ventricular chamber when the prosthesis device 100 is implanted in the native mitral valve. In some embodiments, the plurality of ventricular posts comprises a first anterior post 140a, a second anterior post 140b, and a posterior post 140c.

In some embodiments, an anterior valve leaflet 110a is fixedly attached to the first anterior post 140a and the second anterior post 140b. In some embodiments, a first posterior valve leaflet 110b is fixedly attached to the second anterior post 140b and the posterior post 140c. In some embodiments, a second posterior valve leaflet 110c is fixedly attached to the posterior post 140c and the first anterior post 140a. In some embodiments, the anterior valve leaflet 110a, the first posterior valve leaflet 110b, the second posterior valve leaflet 110c, or any combination thereof has a flexible membrane. In some embodiments, the anterior valve leaflet, the first posterior valve leaflet, the second posterior valve leaflet, or any combination thereof is at least partially made of decellularized tissue or synthetic tissue.

In some embodiments, the anterior valve leaflet 110a is larger than each of the first posterior valve leaflet 110b and the second posterior valve leaflet 110c. In some embodiments, an angle along the free edge of the anterior leaflet 116a is greater than each angle along the free edge of the first posterior leaflet 116b and each angle along the free edge of the second posterior leaflet 116c.

Peripheral Ring

In some embodiments, a peripheral ring 150 surrounds the central opening 122 and is fixedly attached to the stent frame assembly 120. In some embodiments, the peripheral ring 150 contacts the peripheral edge 128 of the stent frame assembly 120. In some embodiments, the peripheral ring 150 is joined with suture or sewn to the stent frame assembly 120.

In some embodiments, the peripheral ring 150 is a sewing ring. In some embodiments, the peripheral ring or the sewing ring provides a platform through which attachment structure (e.g., sutures, staples, clips, or fasteners) may be passed to secure the prosthesis device 100 to the native mitral valve annulus. The peripheral ring or sewing ring can be made thinner or thicker in diameter to suit different sewing techniques and does not have a bearing on the haemodynamic performance of the prosthesis device. In some embodiments, a metal wire is inside of the peripheral ring or the sewing ring to help with visualization of the prosthesis device 100 under imaging. In some embodiments, the peripheral ring or sewing ring comprises one or more layers. In some embodiments, the peripheral ring or sewing ring comprises one or more fabrics.

In some embodiments, the peripheral ring 150 is configured to fit over a native mitral valve annulus of a native mitral valve when the prosthesis device 100 is implanted in the native mitral valve of a subject. In some embodiments, the peripheral ring 150 is shaped to match a shape of the native mitral valve annulus so as to fit thereon when the prosthesis device 100 is implanted in the native mitral valve annulus. In some embodiments, the peripheral ring 150 is flexible in the plane of the native mitral valve annulus. In some embodiments, the peripheral ring 150 is more flexible in the plane of the native mitral valve annulus than in a plane transverse to the plane of the native mitral valve annulus.

In some embodiments, the peripheral ring 150 is non-circular shaped. In some embodiments, the peripheral ring is approximately D-shaped (i.e., the approximately straight side of a "D" shape is an arc with a radius of curvature substantially greater than the radius of curvature of the arc of the "D"). In some embodiments, the shape of the peripheral ring 150 is symmetrical about an Anterior-Posterior midline axis. In some embodiments, the shape of the peripheral ring 150 is asymmetrical about a Transverse midline axis. In some embodiments, the peripheral ring 150 has the same shape as the peripheral edge 128 of the stent frame assembly. In some embodiments, the peripheral ring 150 has a peripheral edge 151. In some embodiments, the peripheral edge 151 of the peripheral ring 150 and the peripheral edge 128 of the stent frame assembly 120 have the same shape. In some embodiments, the peripheral edge 151 of the peripheral ring 150 is approximately D-shaped. In some embodiments, the shape of the peripheral edge 151 of the peripheral ring 150 is symmetrical about an Anterior-Posterior midline axis. In some embodiments, the shape of the peripheral edge 151 of the peripheral ring 150 is asymmetrical about a Transverse midline axis.

FIG. 2 depicts a topic plane view of the mitral valve prosthesis device of FIG. 1, demonstrating the approximate "D" shapes of the peripheral ring 150, the peripheral edge 151, and the peripheral edge 128 of the stent frame assembly 120.

As a non-limiting example, measurements can be made of an exemplary peripheral ring of an exemplary device, wherein the exemplary device corresponds to about a 31 mm diameter circular valve device. The exemplary peripheral ring 150 may have an outer anterior-posterior (AP) diameter of about 39.8 mm. The exemplary peripheral ring 150 may have an outer transverse diameter of about 47.1 mm. The exemplary peripheral ring 150 may have an inner anterior-posterior (AP) diameter of about 26.4 mm. The exemplary peripheral ring 150 may have an inner transverse diameter of about 32.6 mm. The exemplary peripheral ring may be made thinner or thicker from such dimensions to suit a different sewing technique. While such an exemplary device is described as having a periphery corresponding to that of a cardiac valve device having a 31 mm diameter circular stent frame, a device of the present disclosure can correspond to other sized stent frames as well, for example, those having a diameter between about a 20 mm to about a 40 mm diameter circular valve.

In some embodiments, the peripheral edge 151 of the peripheral ring has a first anterior corner 253a, a second anterior corner 253b, and a posterior corner 253c. In some embodiments, the first anterior post 140a is positioned at the first anterior corner 253a, the second anterior post 140b is positioned at the second anterior corner 253b, and the posterior post 140c is positioned at the posterior corner 253c.

In some embodiments, the peripheral edge 151 of the peripheral ring has an anterior edge 255a, wherein the anterior edge is positioned between the first and second anterior corners 253a, 253b. In some embodiments, the peripheral ring 150 has a first posterior edge 255b, wherein the first posterior edge is positioned between the second anterior corner 253b and the posterior corner 253c. In some embodiments, the peripheral ring 150 has a second posterior edge 255c, wherein the second posterior edge is positioned between the posterior corner 253c and the first anterior corner 253a. In some embodiments, the anterior edge 255a, the first posterior edge 255b, and the second posterior edge 255c of the peripheral ring 150 are sized and shaped to match complementary portions of the native mitral valve annulus. In some embodiments, the anterior edge 255a is one or more of flatter or longer than each of the first and second posterior edges 255b, 255c.

In some embodiments, the anterior edge 255a is longer than each of the first and second posterior edges 255b and 255c.

Valve Leaflets

In some embodiments, each valve leaflet of the plurality of valve leaflets 110a, 110b, and 110c has a fixed edge coupled to the stent frame assembly 120. In some embodiments, the anterior valve leaflet 110a has a fixed edge 217a supported by the first anterior post 140a and the second anterior posts 140b. In some embodiments, the first posterior valve leaflet 110b has a fixed edge 217b supported by the second anterior post 140b and the posterior post 140c. In some embodiments, the second posterior valve leaflet 110c has a fixed edge 217c supported by the posterior post 140c and the first anterior post 140a.

In some embodiments, the anterior valve leaflet 110a is fixedly attached to the stent frame assembly 120 adjacent to the anterior edge 253a of the peripheral ring 150. In some embodiments, the first posterior valve leaflet 110b is fixedly attached to the stent frame assembly 120 adjacent to the first posterior edge 253b of the peripheral ring 150. In some embodiments, the second posterior valve leaflet 110c is fixedly attached to the stent frame assembly 120 adjacent to the second posterior edge 253c of the peripheral ring 150.

In some embodiments, the anterior valve leaflet 110a is larger than each of the first and second posterior valve leaflets 110b and 110c. In some embodiments, a distance 244a between the first anterior post 140a and the second anterior posts 140b is greater than distances 244b and 244c between each anterior post and the posterior post 140c. In some embodiments, a ratio of the distance between the first and second anterior posts 244a to the sum of the distances 244a, 244b, and 244c is greater than 0.33. In some embodiments, a ratio of the distance between the first and second anterior posts 244a to the sum of the distances 244a, 244b, and 244c is about 0.4. In some embodiments a ratio of the distance between the first and second anterior posts 244a to the sum of the distances 244a, 244b, and 244c is between about 0.35 to about 0.45.

Atrial and Ventricular Portions of the Stent Frame Assembly

Figure 3:
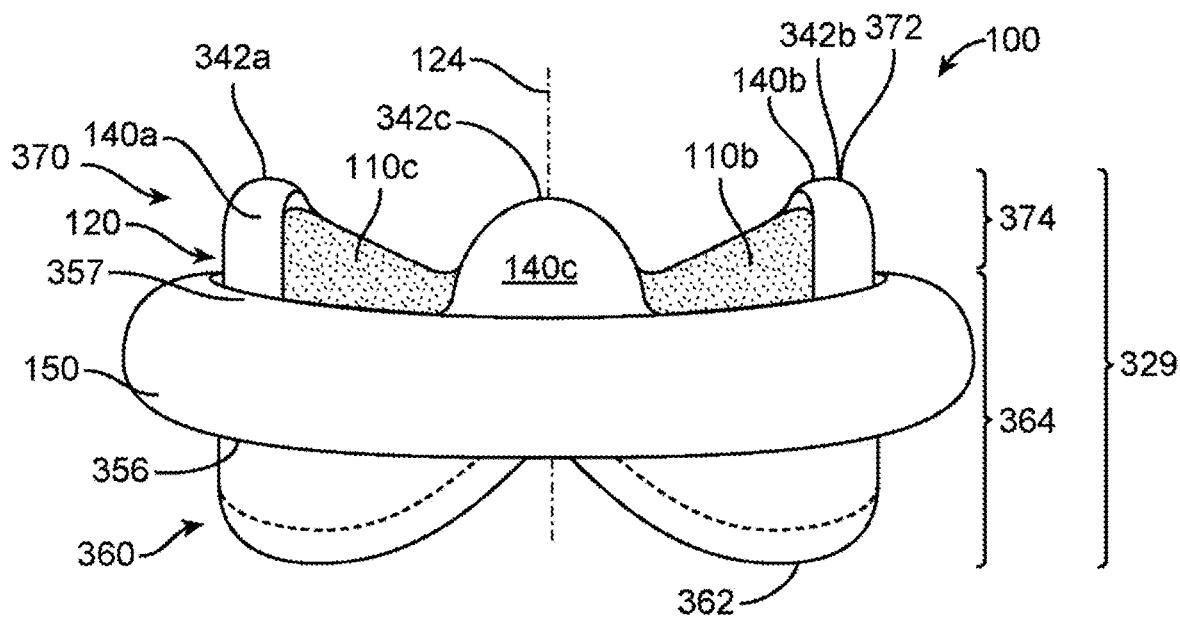
FIG. 3 is an elevational view of the mitral valve prosthesis device of FIG. 1.

FIG. 3 depicts an elevational view of the mitral valve prosthesis device 100. In some embodiments, the stent frame assembly 120 has an atria-facing atrial portion 360 and a ventricular-facing ventricular portion 370. In some embodiments, the central opening 122 traverses between the atrial and ventricular portions. In some embodiments, the stent frame assembly 120 is configured so that, when the prosthesis device 100 is implanted in the native mitral valve or on an atrial-facing side of the native mitral valve annulus, the atrial portion 360 is positioned in an atrial chamber of a heart and the ventricular portion 370 is positioned in a ventricular chamber of the heart.

In some embodiments, the atrial portion 360 is scalloped. In some embodiments, the ventricular portion 360 is scalloped. In some embodiments, the peripheral ring 150 is scalloped in the atrioventricular direction.

In some embodiments, the atrial portion 360 includes a atria-facing superior end 362. In some embodiments, the ventricular portion 370 includes a ventricular-facing inferior end 372. In some embodiments, the stent frame assembly 120 has a height 329 measured between the superior end 362 and the inferior end 372.

As a non-limiting example, measurements can be made of an atrial portion of an exemplary device, wherein the exemplary device corresponds to about a 31 mm diameter circular valve device. In some embodiments, the height 329 measured between the superior end 362 and the inferior end 372 is about 16.3 mm. In some embodiments, the height 329 is between about 12 mm to about 20 mm. In some embodiments, the height 329 is between about 12 mm to about 14 mm, about 14 mm to about 16 mm, about 16 mm to about 18 mm, or about 18 mm to about 20 mm. In some embodiments, the height 329 is about 12 mm, about 12.2 mm, about 12.4 mm, about 12.6 mm, about 12.8 mm, about 13 mm, about 13.2 mm, about 13.4 mm, about 13.6 mm, about 13.8 mm, about 14 mm, about 14.2 mm, about 14.4 mm, about 14.6 mm, about 14.8 mm, about 15 mm, about 15.2 mm, about 15.4 mm, about 15.6 mm, about 15.8 mm, about 16 mm, about 16.2 mm, about 16.4 mm, about 16.6 mm, about 16.8 mm, about 17 mm, about 17.2 mm, about 17.4 mm, about 17.6 mm, about 17.8 mm, about 18 mm, about 18.2 mm, about 18.4 mm, about 18.6 mm, about 18.8 mm, about 19 mm, about 19.2 mm, about 19.4 mm, about 19.6 mm, about 19.8 mm, or about 20 mm.

In some embodiments, the ventricular portion 370 includes the plurality of ventricular posts 140a, 140b, 140c. In some embodiments, the first anterior post 140a has a ventricular-facing inferior post end 342a. In some embodiments, the second anterior post 140b has a ventricular-facing inferior post end 342b. In some embodiments, the posterior post 140c has a ventricular facing inferior post end 342c. In some embodiments, the inferior end 372 of the ventricular portion 370 is one of the inferior post ends 342a, 342b, 342c. In some embodiments, the height 329 is measured between the superior end 362 and one of the inferior post ends 342a, 342b, 342c.

In some embodiments, the peripheral ring 150 is disposed between the atrial portion 360 and the ventricular portion 370. In some embodiments, the peripheral ring 150 positions the ventricular portion 370 of the stent frame assembly 120 on the mitral valve annulus such that protrusion of the stent frame assembly into a ventricular chamber is reduced. In some embodiments, the peripheral ring 150 positions the ventricular portion 370 of the stent frame assembly 120 on the mitral valve annulus such that protrusion of the stent frame assembly into a ventricular chamber and an effect on ventricular outflow or excursion of a native leaflet by such protrusion are reduced.

In some embodiments, the peripheral ring 150 positions the ventricular portion 370 of the stent frame assembly 120 on the mitral valve annulus such that protrusion of the plurality of ventricular posts 140a, 140b, 140c into a ventricular chamber is reduced. In some embodiments, the peripheral ring 150 positions the ventricular portion 370 of the stent frame assembly 120 on the mitral valve annulus such that protrusion of the plurality of ventricular posts 140a, 140b, 140c into a ventricular chamber is reduced and an effect on ventricular outflow or excursion of a native leaflet by such protrusion is also reduced.

In some embodiments, the peripheral ring 150 positions the ventricular portion 370 of the stent frame assembly 120 on the mitral valve annulus such that protrusion of the first and second anterior posts 140a, 140b into a ventricular chamber is reduced. In some embodiments, the peripheral ring 150 positions the ventricular portion 370 of the stent frame assembly 120 on the mitral valve annulus such that protrusion of the first and second anterior posts 140a, 140b into a ventricular chamber is reduced and an effect on ventricular outflow or excursion of a native leaflet by such protrusion is also reduced.

In some embodiments, the peripheral ring 150 has an atria-facing superior-most surface 356 and a ventricular-facing inferior-most surface 357. In some embodiments, the ventricular-facing inferior-most surface 357 is configured to fit over a native mitral valve annulus when the prosthesis device 100 is implanted in a native mitral valve. In some embodiments, the inferior-most surface 357 contacts an atria-facing side of a native mitral valve annulus.

Ventricular Length of the Stent Frame Assembly

In some embodiments, the ventricular portion 370 has a ventricular length 374 that is measured between the inferior-most surface 357 of the peripheral ring 150 and the inferior end 372 of the stent frame assembly 120. In some embodiments, the ventricular length 374 is less than about 66% of the height 329 of the stent frame assembly 120. In some embodiments, the ventricular length 374 is less than about 50% of the height 329 of the stent frame assembly 120. In some embodiments, the ventricular length 374 is less than about 33% of the height 329 of the stent frame assembly 120. In some embodiments, the ventricular length 374 and/or the height 329 are measured on the anterior side of the valve prosthesis 100.

In some embodiments, the ventricular length 374 is less than about 66%, less than about 64%, less than about 62%, less than about 60%, less than about 58%, less than about 56%, less than about 54%, less than about 52%, less than about 50%, less than about 48%, less than about 46%, less than about 44%, less than about 42%, less than about 40%, less than about 38%, less than about 36%, less than about 34%, less than about 32%, less than about 30%, less than about 28%, less than about 26%, less than about 24%, less than about 22%, less than about 20%, less than about 18%, or less than about 16% of the height 329 of the stent frame assembly 120.

As a non-limiting example, measurements can be made of a ventricular length of an exemplary device, wherein the exemplary device corresponds to about a 31 mm diameter circular valve device. In some embodiments, the ventricular length 374 is less than about 10 mm. In some embodiments, the ventricular length 374 is about 8.8 mm or less. In some embodiments, the ventricular length 374 is about 5.2 mm or less. In some embodiments, the ventricular length 374 is less than about 10 mm, less than about 9.5 mm, less than about 9 mm, less than about 8.5 mm, less than about 8 mm, less than about 7.5 mm, less than about 7 mm, less than about 6.5 mm, less than about 6 mm, less than about 5.5 mm, less than about 5 mm, less than about 4.5 mm, less than about 4 mm, less than about 3.5 mm, less than about 3 mm, less than about 2.5 mm, less than about 2 mm, or less than about 1.5 mm.

In some embodiments, a ratio of the ventricular length 374 to the height 329 of the stent frame assembly 120 is less than 13:20, less than 12:20, less than 11:20, less than 10:20, less than 9:20, less than 8:20, less than 7:20, less than 6:20, less than 5:20, less than 4:20, or less than 3:20. In some embodiments, a ratio of the ventricular length 374 to the height 329 of the stent frame assembly 120 is less than 2:3, less than 1:2, or less than 1:3.

In some embodiments, the ventricular length 374 is between about 15% to about 65% of the height 329 of the stent frame assembly 120. In some embodiments, the ventricular length 374 is between about 15% to about 20%, between about 20% to about 25%, between about 25% to about 30%, between about 30% to about 35%, between about 35% to about 40%, between about 40% to about 45%, between about 45% to about 50%, between about 50% to about 55%, between about 55% to about 60%, or between about 60% to about 65% of the height 329 of the stent frame assembly 120.

As a non-limiting example, measurements can be made of a ventricular length of an exemplary device, wherein the exemplary device corresponds to about a 31 mm diameter circular valve device. In some embodiments, the ventricular length 374 is about 5.2 mm. In some embodiments, the ventricular length 374 is about 8.8 mm. In some embodiments, the ventricular length 374 is between about 1.5 mm to about 10 mm. In some embodiments, the ventricular length 374 is between about 1.5 mm to about 2 mm, between about 2 mm to about 2.5 mm, between about 2.5 mm to about 3 mm, between about 3 mm to about 3.5 mm, between about 3.5 mm to about 4 mm, between about 4 mm to about 4.5 mm, between about 4.5 mm to about 5 mm, between about 5 mm to about 5.5 mm, between about 5.5 mm to about 6 mm, between about 6 mm to about 6.5 mm, between about 6.5 mm to about 7 mm, between about 7 mm to about 7.5 between about 7.5 mm to about 8 mm, between about 8 mm to about 8.5 mm, between about 8.5 mm to about 9 mm, between about 9 mm to about 9.5 mm, or between about 9.5 mm to about 10 mm.

In some embodiments, the ventricular length 374 is about 1.6 mm, about 1.8 mm, about 2 mm, about 2.2 mm, about 2.4 mm, about 2.6 mm, about 2.8 mm, about 3 mm, about 3.2 mm, about 3.4 mm, about 3.6 mm, about 3.8 mm, about 4 mm, about 4.2 mm, about 4.4 mm, about 4.6 mm, about 4.8 mm, about 5 mm, about 5.2 mm, about 5.4 mm, about 5.6 mm, about 5.8 mm, about 6 mm, about 6.2 mm, about 6.4 mm, about 6.6 mm, about 6.8 mm, about 7 mm, about 7.2 mm, about 7.4 mm, about 7.6 mm, about 7.8 mm, about 8 mm, about 8.2 mm, about 8.4 mm, about 8.6 mm, about 8.8 mm, about 9 mm, about 9.2 mm, about 9.4 mm, about 9.6 mm, about 9.8 mm, or about 10 mm.

In some embodiments, a ratio of the ventricular length 374 to the height 329 of the stent frame assembly 120 is about 7:20. In some embodiments, a ratio of the ventricular length 374 to the height 329 of the stent frame assembly 120 is about 11:20. In some embodiments, a ratio of the ventricular length 374 to the height 329 of the stent frame assembly 120 is between 3:20 and 13:20. In some embodiments, a ratio of the ventricular length 374 to the height 329 of the stent frame assembly 120 is about 3:20, about 4:20, about 5:20, about 6:20, about 7:20, about 8:20, about 9:20, about 10:20, about 11:20, about 12:20 or about 13:20. In some embodiments, a ratio of the ventricular length 374 to the height 329 of the stent frame assembly 120 is about 1:3, about 1:2, or about 2:3.

Atrial Length of the Stent Frame Assembly

In some embodiments, the atrial portion 360 has an atrial length 364 measured between the inferior-most surface 357 of the peripheral ring 150 and the superior end 362 of the stent frame assembly 120. In some embodiments, the atrial length 364 is more than about 33% of the height 329 of the stent frame assembly 120. In some embodiments, the atrial length 364 is more than about 50% of the height 329 of the stent frame assembly 120. In some embodiments, the atrial length 364 is more than about 66% of the height 329 of the stent frame assembly 120. In some embodiments, the atrial length 364 and/or the height 329 are measured on the anterior side of the valve prosthesis 100.

In some embodiments, the atrial length 364 is more than about 34%, more than about 36%, more than about 38%, more than about 40%, more than about 42%, more than about 44%, more than about 46%, more than about 48%, more than about 50%, more than about 52%, more than about 54%, more than about 56%, more than about 60%, more than about 62%, more than about 64%, more than about 66%, more than about 68%, more than about 70%, more than about 72%, more than about 74%, more than about 76%, more than about 78%, more than about 80%, more than about 82%, or more than about 84% of the height 329 of the stent frame assembly 120.

As a non-limiting example, measurements can be made of an atrial length of an exemplary device, wherein the exemplary device corresponds to about a 31 mm diameter circular valve device. In some embodiments, the atrial length 364 is more than about 6 mm. In some embodiments, the atrial length 364 is about 7.5 mm or more. In some embodiments, the atrial length 364 is about 11.1 mm or more. In some embodiments, the atrial length 364 is more than about 6 mm, more than about 6.5 mm, more than about 7 mm, more than about 7.5 mm, more than about 8 mm, more than about 8.5 mm, more than about 9 mm, more than about 9.5 mm, more than about 10 mm, more than about 10.5 mm, more than about 11 mm, more than about 11.5 mm, more than about 12 mm, more than about 12.5 mm, more than about 13 mm, more than about 13.5 mm, or more than about 14 mm.

In some embodiments, the atrial length 364 is between about 35% to about 85% of the height 329 of the stent frame assembly 120. In some embodiments, the atrial length 364 is between about 35% to about 40%, between about 40% to about 45%, between about 45% to about 50%, between about 50% to about 55%, between about 55% to about 60%, between about 60% to about 65%, between about 65% to about 70%, between about 70% to about 75%, between about 75% to about 80%, or between about 80% to about 85% of the height 329 of the stent frame assembly 120.

As a non-limiting example, measurements can be made of an atrial length of an exemplary device, wherein the exemplary device corresponds to about a 31 mm diameter circular valve device. In some embodiments, the atrial length 364 is about 7.5 mm. In some embodiments, the atrial length 364 is about 11.1 mm. In some embodiments, the atrial length 364 is between about 6 mm to about 14 mm. In some embodiments, the atrial length 364 is between about 6 mm to about 6.5 mm, between about 6.5 mm to about 7 mm, between about 7 mm to about 7.5 mm, between about 7.5 mm to about 8 mm, between about 8 mm to about 8.5 mm, between about 8.5 mm to about 9 mm, between about 9 mm to about 9.5 mm, between about 9.5 mm to about 10 mm, between about 10 mm to about 10.5 mm, between about 10.5 mm to about 11 mm, between about 11 mm to about 11.5 mm, between about 11.5 mm to about 12 mm, between about 12 mm to about 12.5 mm, between about 12.5 mm to about 13 mm, between about 13 mm to about 13.5 mm, or between about 13.5 mm to about 14 mm.

In some embodiments, the atrial length 364 is about 6 mm, about 6.2 mm, about 6.4 mm, about 6.6 mm, about 6.8 mm, about 7 mm, about 7.2 mm, about 7.4 mm, about 7.6 mm, about 7.8 mm, about 8 mm, about 8.2 mm, about 8.4 mm, about 8.6 mm, about 8.8 mm, about 9 mm, about 9.2 mm, about 9.4 mm, about 9.6 mm, about 9.8 mm, about 10 mm, about 10.2 mm, about 10.4 mm, about 10.6 mm, about 10.8 mm, about 11 mm, about 11.2 mm, about 11.4 mm, about 11.6 mm, about 11.8 mm, about 12 mm, about 12.2 mm, about 12.4 mm, about 12.6 mm, about 12.8 mm, about 13 mm, about 13.2 mm, about 13.4 mm, about 13.6 mm, about 13.8 mm, about 14 mm, or about 14 mm.

Figure 4:
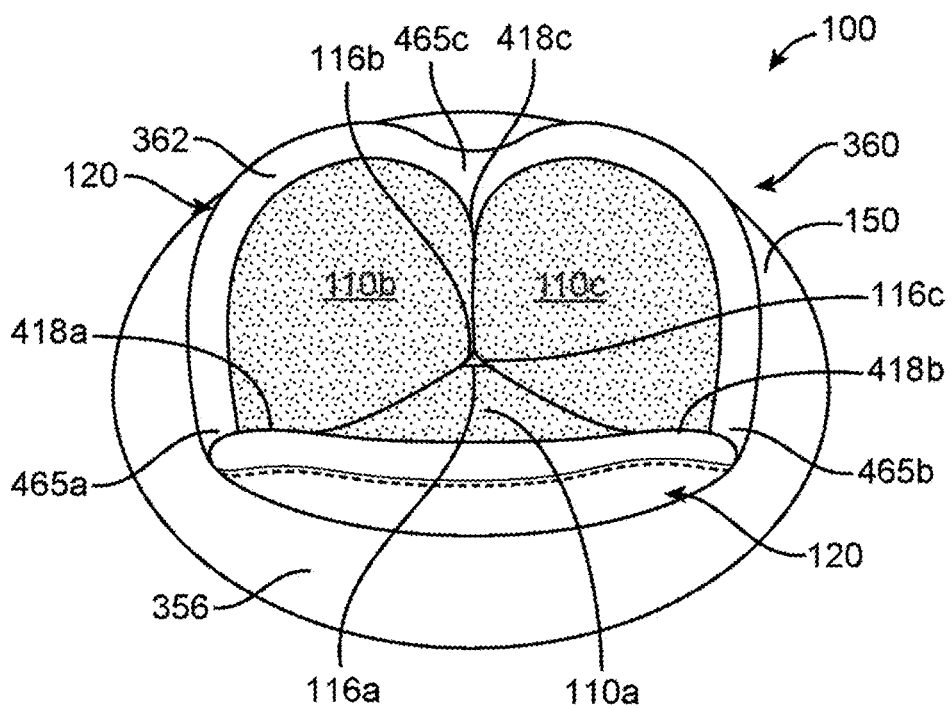
FIG. 4 is a perspective view of an atrial end of an exemplary mitral valve prosthesis device of the present disclosure, the atrial end being configured to protrude into an atrial chamber.

FIG. 4 is a perspective view of an atrial end of the mitral valve prosthesis device 100 of the present disclosure configured to protrude into an atrial chamber. In some embodiments, the atrial end of the stent frame assembly 120 is scalloped. In some embodiments, the atrial end of the stent frame assembly has a plurality of scallop tips 465a, 465b, and 465c. In some embodiments, each scallop tip is approximately flush with the peripheral ring 150.

In some embodiments, the plurality of leaflets 140a, 140b, and 140c define a first anterior commissure 418a between adjacent free edges of the anterior leaflet 110a and the first posterior leaflet 110b, a second anterior commissure 418b between adjacent free edges of the anterior leaflet 110a and the second posterior valve leaflet 110c, and a posterior commissure 418c between adjacent free edges of the first posterior leaflet 110b and the second posterior leaflet 110c.

Stent Frame

In some embodiments, the stent frame assembly comprises a stent frame. FIG. 5 is a perspective view of a stent frame 530 of the exemplary mitral valve prosthesis device 100 of the present disclosure. In some embodiments, the stent frame 530 is non-circular shaped. In some embodiments, the stent frame 530 is approximately D-shaped (i.e., the approximately straight side of a "D" shape is an arc with a radius of curvature substantially greater than the radius of curvature of the arc of the "D"). In some embodiments, the shape of the stent frame 530 is symmetrical about an Anterior-Posterior midline axis. In some embodiments, the shape of the stent frame 530 is asymmetrical about a Transverse midline axis. In some embodiments, the stent frame 530 is configured to fit inside of the peripheral ring of the prosthesis device.

In some embodiments, the stent frame 530 is made of biocompatible materials (e.g., metals or plastics). In some embodiments, the stent frame 530 is made of stainless steel, Elgiloy, Delrin or a biocompatible plastic (e.g., polyethylene, PEEK, and similar materials).

In some embodiments, the stent frame 530 has a plurality of suture holes 531. In some embodiments, the plurality of suture holes 531 are used to fixedly couple the plurality of valve leaflets to the stent frame assembly with sutures. In some embodiments, the plurality of suture holes 531 are used to attach the peripheral ring to the stent frame assembly with sutures. In some embodiments, the plurality of suture holes 531 are used to attach a covering to the stent frame 530 with sutures. In some embodiments, the suture holes are used for the assembly of the stent frame assembly 120 and attaching the peripheral ring 150 to the stent frame assembly. In some embodiments, multiple suture lines can pass through a hole of the plurality of suture holes. In some embodiments, at least two of the plurality of valve leaflets, the peripheral ring, or the covering can be attached to the stent frame sequentially, wherein multiple suture lines pass through a hole of the plurality of suture holes or a hole of the plurality of suture holes is threaded multiple times.

In some embodiments, the stent frame 530 has an inner anterior frame edge 533a and an outer anterior frame edge 535a. In some embodiments, the stent frame 530 has an inner first posterior frame edge 533b and an outer first posterior frame edge 535b. In some embodiments, the stent frame 530 has an inner second posterior frame edge 533c and an outer second posterior frame edge 535c. In some embodiments, the inner anterior frame edge 533a is one or more of flatter or longer than each of the inner first posterior frame edge 533b and inner second posterior frame edge 533c. In some embodiments, the outer anterior frame edge 535a is one or more of flatter or longer than each of the outer first posterior frame edge 535b and outer second posterior frame edge 535c.

In some embodiments, the outer frame edges 535a, 535b, and 535c are defined by the peripheral ring, or the peripheral edge of the peripheral ring, surrounding the stent frame 530 or the stent frame assembly.

In some embodiments, the stent frame 530 has a plurality of frame posts 540a, 540b, 540c, wherein each frame post extends from a ventricular end 581 of a cylinder 580. In some embodiments, the central flow axis 124 runs through the cylinder 580. In some embodiments, the cylinder is an asymmetric cylinder. In some embodiments, the cylinder 580 has a non-circular cross-section. In some embodiments, the cylinder 580 has a cross-section that is approximately D-shaped. In some embodiments, the cross-section of the cylinder 580 is symmetrical about an Anterior-Posterior midline axis. In some embodiments, the cross-section of the cylinder 580 is asymmetrical about a Transverse midline axis. In some embodiments, the cross-section of the cylinder 580 and the peripheral edge 128 of the stent frame assembly 120 have the same shape.

Each frame post of the plurality of frame posts has a ventricular-facing inferior end configured to protrude into the ventricular chamber when the prosthesis device 100 is implanted in the native mitral valve. In some embodiments, the plurality of frame posts comprises a first anterior frame post 540a, a second anterior frame post 540b, and a posterior frame post 540c.

In some embodiments, the first anterior frame post 540a is configured to fixedly attach the anterior valve leaflet and the second posterior valve leaflet to the stent frame 530. In some embodiments, the second anterior frame post 540b is configured to fixedly attach the anterior valve leaflet and the first posterior valve leaflet. In some embodiments, the posterior frame post 540c is configured to fixedly attach the first and second posterior valve leaflets to the stent frame 530.

FIG. 6A is an elevational view of the stent frame of FIG. 5. FIG. 6B is a cross-sectional view taken along the indicated section line in FIG. 6A.

In some embodiments, the cylinder 580 has two ends, an atrial end configured to protrude into an atrial chamber of a heart when the prosthesis device 100 is implanted in a native mitral valve of the heart and a ventricular end 581 abutting the plurality of frame posts 540a. 540b, and 540c. In some embodiments, the cylinder 580 has a superior-most atrial end 582.

In some embodiments, the stent frame 530 has a total height 639 that can be measured from the superior-most end 582 of the cylinder 580 to the inferior-most end of one or more frame posts 540a, 540b, and 540c.

As a non-limiting example, measurements can be made of a total height 639 of a stent frame of an exemplary device, wherein the exemplary device corresponds to about a 31 mm diameter circular valve device. In some embodiments, the total height 639 is about 16.3 mm. In some embodiments, the total height 639 is between about 12 mm to about 20 mm. In some embodiments, the total height 639 is between about 12 mm to about 14 mm, about 14 mm to about 16 mm, about 16 mm to about 18 mm, or about 18 mm to about 20 mm. In some embodiments, the total height 639 is about 12 mm, about 12.2 mm, about 12.4 mm, about 12.6 mm, about 12.8 mm, about 13 mm, about 13.2 mm, about 13.4 mm, about 13.6 mm, about 13.8 mm, about 14 mm, about 14.2 mm, about 14.4 mm, about 14.6 mm, about 14.8 mm, about 15 mm, about 15.2 mm, about 15.4 mm, about 15.6 mm, about 15.8 mm, about 16 mm, about 16.2 mm, about 16.4 mm, about 16.6 mm, about 16.8 mm, about 17 mm, about 17.2 mm, about 17.4 mm, about 17.6 mm, about 17.8 mm, about 18 mm, about 18.2 mm, about 18.4 mm, about 18.6 mm, about 18.8 mm, about 19 mm, about 19.2 mm, about 19.4 mm, about 19.6 mm, about 19.8 mm, or about 20 mm.

In some embodiments, a frame post height 674 can be measured from the ventricular end 581 of the cylinder 580 to the inferior-most end of one or more frame posts 540a, 540b, and 540c. In some embodiments, the frame post height 674 is the same whether it is measured from the inferior-most end of frame post 540a, 540b, or 540c.

As a non-limiting example, measurements can be made of a frame post height 674 of an exemplary device, wherein the exemplary device corresponds to about a 31 mm diameter circular valve device. In some embodiments, the frame post height 674 is about 5.2 mm. In some embodiments, the frame post height 674 is about 8.8 mm. In some embodiments, the frame post height 674 is between about 1.5 mm to about 10 mm. In some embodiments, the frame post height 674 is between about 1.5 mm to about 2 mm, between about 2 mm to about 2.5 mm, between about 2.5 mm to about 3 mm, between about 3 mm to about 3.5 mm, between about 3.5 mm to about 4 mm, between about 4 mm to about 4.5 mm, between about 4.5 mm to about 5 mm, between about 5 mm to about 5.5 mm, between about 5.5 mm to about 6 mm, between about 6 mm to about 6.5 mm, between about 6.5 mm to about 7 mm, between about 7 mm to about 7.5 between about 7.5 mm to about 8 mm, between about 8 mm to about 8.5 mm, between about 8.5 mm to about 9 mm, between about 9 mm to about 9.5 mm, or between about 9.5 mm to about 10 mm.

In some embodiments, the frame post height 674 is about 1.6 mm, about 1.8 mm, about 2 mm, about 2.2 mm, about 2.4 mm, about 2.6 mm, about 2.8 mm, about 3 mm, about 3.2 mm, about 3.4 mm, about 3.6 mm, about 3.8 mm, about 4 mm, about 4.2 mm, about 4.4 mm, about 4.6 mm, about 4.8 mm, about 5 mm, about 5.2 mm, about 5.4 mm, about 5.6 mm, about 5.8 mm, about 6 mm, about 6.2 mm, about 6.4 mm, about 6.6 mm, about 6.8 mm, about 7 mm, about 7.2 mm, about 7.4 mm, about 7.6 mm, about 7.8 mm, about 8 mm, about 8.2 mm, about 8.4 mm, about 8.6 mm, about 8.8 mm, about 9 mm, about 9.2 mm, about 9.4 mm, about 9.6 mm, about 9.8 mm, or about 10 mm.

As a non-limiting example, measurements can be made of a frame post height 674 of an exemplary device, wherein the exemplary device corresponds to about a 31 mm diameter circular valve device. In some embodiments, the frame post height 674 is less than about 10 mm. In some embodiments, the frame post height 674 is about 8.8 mm or less. In some embodiments, the frame post height 674 is about 5.2 mm or less. In some embodiments, the frame post height 674 is less than about 10 mm, less than about 9.5 mm, less than about 9 mm, less than about 8.5 mm, less than about 8 mm, less than about 7.5 mm, less than about 7 mm, less than about 6.5 mm, less than about 6 mm, less than about 5.5 mm, less than about 5 mm, less than about 4.5 mm, less than about 4 mm, less than about 3.5 mm, less than about 3 mm, less than about 2.5 mm, less than about 2 mm, or less than about 1.5 mm.

In some embodiments, the cylinder 580 has a cylinder height 684 as measured from the superior-most atrial end 582 to the ventricular end 581 of the cylinder.

As a non-limiting example, measurements can be made of a cylinder height 684 of an exemplary device, wherein the exemplary device corresponds to about a 31 mm diameter circular valve device. In some embodiments, the cylinder height 684 is about 7.5 mm. In some embodiments, the cylinder height 684 is about 11.1 mm. In some embodiments, the cylinder height 684 is between about 6 mm to about 14 mm. In some embodiments, the cylinder height 684 is between about 6 mm to about 6.5 mm, between about 6.5 mm to about 7 mm, between about 7 mm to about 7.5 mm, between about 7.5 mm to about 8 mm, between about 8 mm to about 8.5 mm, between about 8.5 mm to about 9 mm, between about 9 mm to about 9.5 mm, between about 9.5 mm to about 10 mm, between about 10 mm to about 10.5 mm, between about 10.5 mm to about 11 mm, between about 11 mm to about 11.5 mm, between about 11.5 mm to about 12 mm, between about 12 mm to about 12.5 mm, between about 12.5 mm to about 13 mm, between about 13 mm to about 13.5 mm, or between about 13.5 mm to about 14 mm.

In some embodiments, the cylinder height 684 is about 6 mm, about 6.2 mm, about 6.4 mm, about 6.6 mm, about 6.8 mm, about 7 mm, about 7.2 mm, about 7.4 mm, about 7.6 mm, about 7.8 mm, about 8 mm, about 8.2 mm, about 8.4 mm, about 8.6 mm, about 8.8 mm, about 9 mm, about 9.2 mm, about 9.4 mm, about 9.6 mm, about 9.8 mm, about 10 mm, about 10.2 mm, about 10.4 mm, about 10.6 mm, about 10.8 mm, about 11 mm, about 11.2 mm, about 11.4 mm, about 11.6 mm, about 11.8 mm, about 12 mm, about 12.2 mm, about 12.4 mm, about 12.6 mm, about 12.8 mm, about 13 mm, about 13.2 mm, about 13.4 mm, about 13.6 mm, about 13.8 mm, or about 14 mm.

As a non-limiting example, measurements can be made of a cylinder height 684 of an exemplary device, wherein the exemplary device corresponds to about a 31 mm diameter circular valve device. In some embodiments, the cylinder height 684 is more than about 6 mm. In some embodiments, the cylinder height 684 is about 7.5 mm or more. In some embodiments, the cylinder height 684 is about 11.1 mm or more. In some embodiments, the cylinder height 684 is more than about 6 mm, more than about 6.5 mm, more than about 7 mm, more than about 7.5 mm, more than about 8 mm, more than about 8.5 mm, more than about 9 mm, more than about 9.5 mm, more than about 10 mm, more than about 10.5 mm, more than about 11 mm, more than about 11.5 mm, more than about 12 mm, more than about 12.5 mm, more than about 13 mm, more than about 13.5 mm, or more than about 14 mm.

In some embodiment, the atrial end of the cylinder 580 is scalloped. In some embodiments, the atrial end of the cylinder 580 has a scallop tip 583. In some embodiments, the atrial end of the cylinder 580 has a plurality of scallop tips. In some embodiments, a scallop height 689 is measured from the superior-most atrial end 582 to the scallop tip 583.

In some embodiments, the scallop height 689 is about 4.9 mm. In some embodiments, the scallop height 689 is about 7.2 mm. In some embodiments, the scallop height 689 is between about 3 mm to about 10 mm.

Figure 7A:
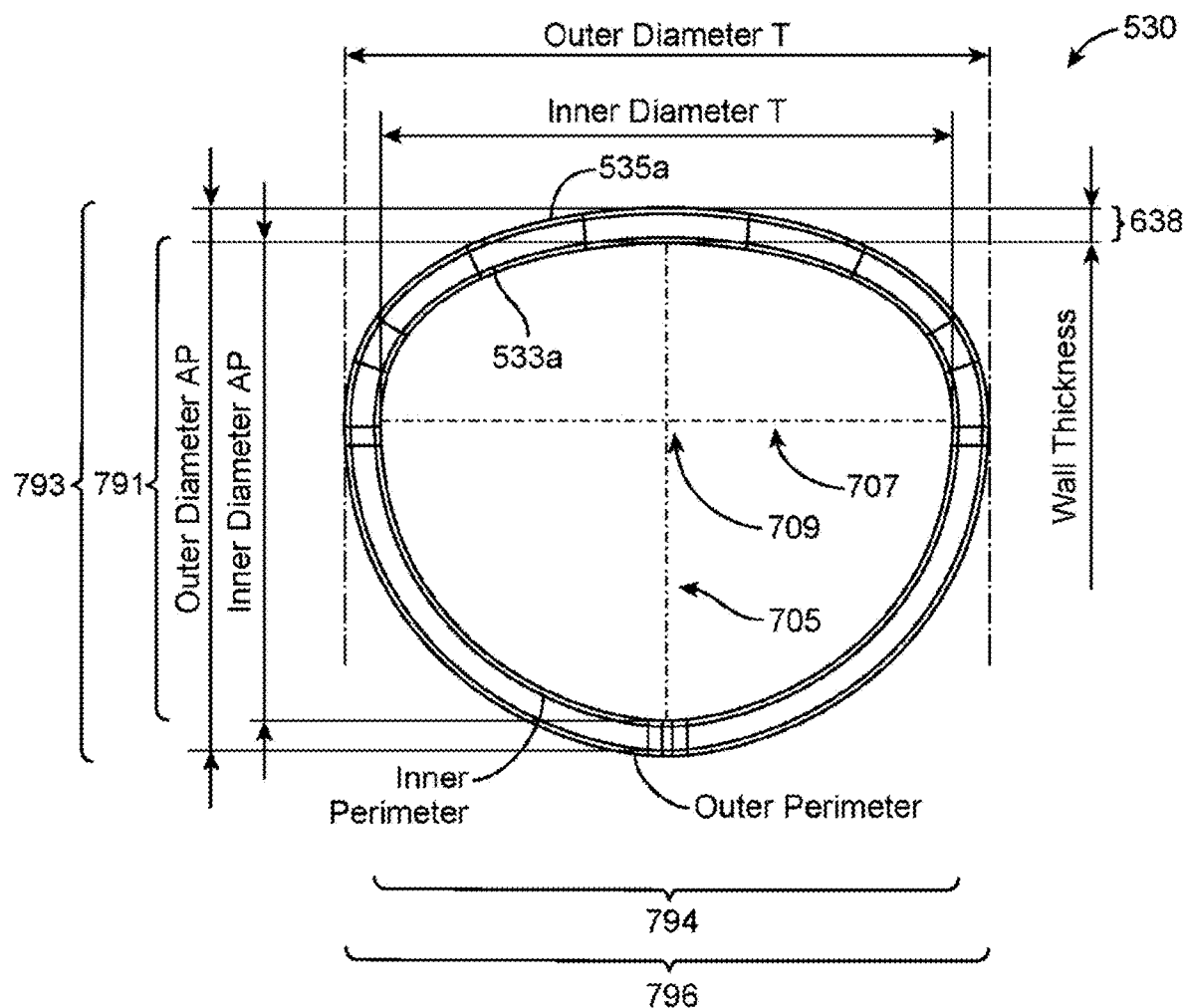
FIGS. 7A-7C are plan views of the stent frame of FIG. 5.

In some embodiments, a width between an outer frame edge and an inner frame edge (e.g., the outer frame edge 535a and the inner frame edge 533a) defines a wall thickness 638, as depicted in the cross-sectional view of FIG. 6B and in the plan view of the stent frame depicted in FIG. 7A. In some embodiments, the wall thickness 638 is about 1.8 mm. In some embodiments, the wall thickness 638 is between about 0.5 mm to about 5 mm.

Diameters and Dimensions of the Stent Frame

Figure 7B:
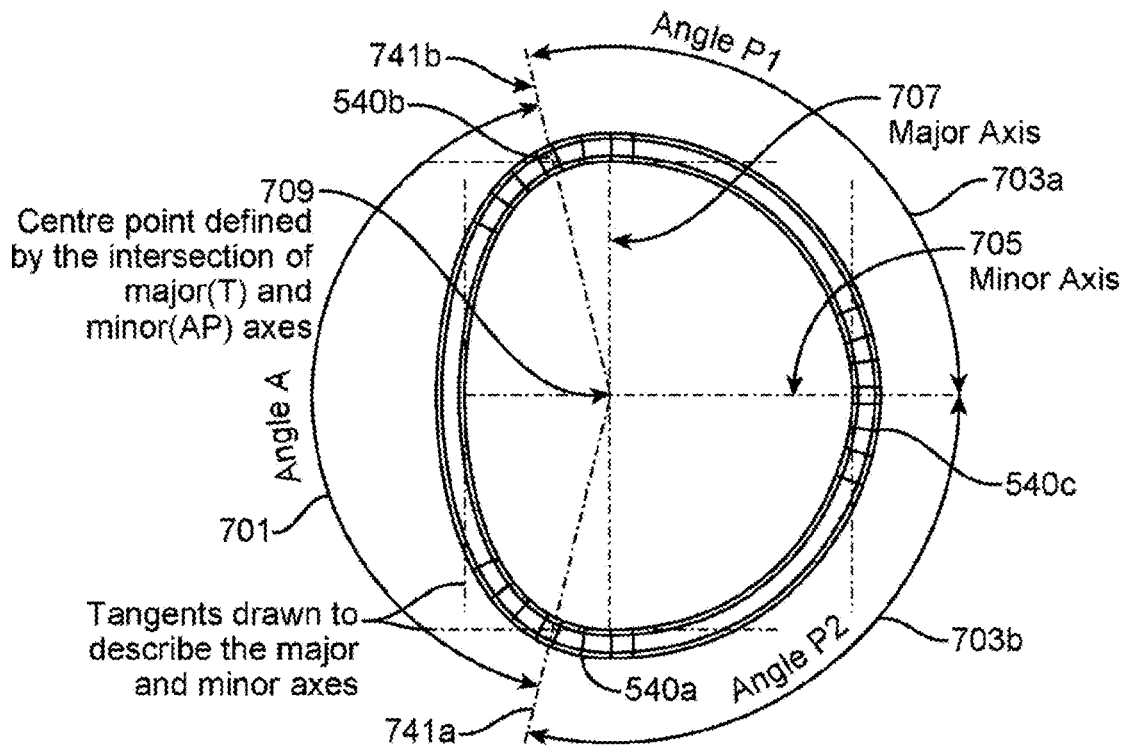
Figure 7C:
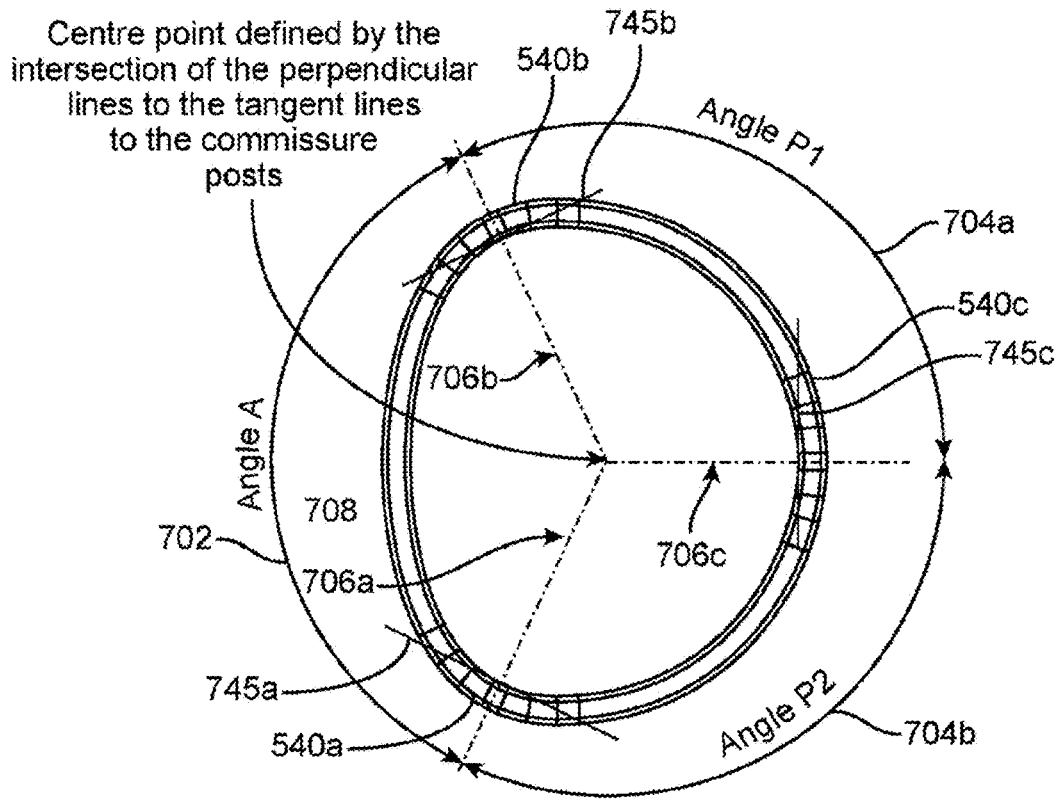

FIG. 7A-7C depict plan views of the stent frame of FIG. 5. FIGS. 7A and 7B depict an anterior-posterior (AP) axis 705 intersecting a transverse axis 707 at an intersection point 709. The stent frame 530 has at least two diameters in each axis direction resulting from the wall thickness 638 of the stent frame.

In some embodiments, the stent frame 530 has an inner anterior-posterior (AP) diameter 791 along the AP axis 705, wherein the inner AP diameter 791 is measured from the inner frame edges of the stent frame 530. In some embodiments, the stent frame 530 has an outer AP diameter 793 along the AP axis 705, wherein the outer AP diameter 793 is measured from the outer frame edges of the stent frame 530.

In some embodiments, the stent frame 530 has an inner transverse diameter 794 along the transverse axis 707, wherein the inner transverse diameter 794 is measured from the inner frame edges of the stent frame 530. In some embodiments, the stent frame 530 has an outer transverse diameter 796 along the transverse axis 707, wherein the outer transverse diameter 796 is measured from the outer frame edges of the stent frame 530.

As a non-limiting example, measurements can be made of a stent frame 530 of an exemplary device wherein the exemplary device corresponds to about a 31 mm diameter circular valve device. The inner AP diameter 791 may be about 25 mm or between about 20 mm to about 30 mm. The outer AP diameter 793 may be about 29 mm or between about 24 mm to about 34 mm. The inner transverse diameter 794 may be about 30 mm or between about 25 mm to about 35 mm. The outer transverse diameter 796 may be about 34 mm or between about 29 mm to about 39 mm.

In some embodiments, a first anterior angle 701 exists between a first reference line 741a and a second reference line 741b, wherein the first reference line 741a extends from the intersection point 709 through the first anterior frame post 540a, and wherein the second reference line 741b extends from the intersection point 709 through the second anterior frame post 540b.

In some embodiments, the first anterior angle 701 is between about 140 degrees to about 164 degrees. In some embodiments, the first anterior angle 701 is about 153 degrees.

In some embodiments, the first anterior angle 701 is greater than 140 degrees, greater than 142 degrees, greater than 144 degrees, greater than 146 degrees, greater than 148 degrees, greater than 150 degrees, or greater than 152 degrees.

In some embodiments, a first P1 angle 703a exists between the second reference line 741b and the AP axis 705. In some embodiments, a first P2 angle 703b exists between the first reference line 741a and the AP axis 705.

In some embodiments, the first P1 angle 703a is between about 90 degrees to about 110 degrees. In some embodiments, the first P1 angle 703a is about 103 degrees.

In some embodiments, the first P2 angle 703b is between about 90 degrees to about 110 degrees. In some embodiments, the first P2 angle 703b is about 103 degrees.

In some embodiments, the sum of the first P1 angle 703a and the first P2 703b is between about 196 to about 220 degrees. In some embodiments, the sum of the first P1 angle 703a and the first P2 703b is less than 214 degrees, less than 212 degrees, less than 210 degrees, less than 208 degrees, less than 206 degrees, less than 204 degrees, less than 202 degrees, or less than 200 degrees.

FIG. 7C depicts a center point 708 defined by the intersection of a first line 706a, a second line 706b, and a third line 706c, wherein the first line 706a is perpendicular to a first tangent line 745a tangent to the frame post 540a, wherein the second line 706b is perpendicular to a second tangent line 745b tangent to the frame post 540b, and wherein the third line 706c is perpendicular to a third tangent line 745c tangent to the frame post 540c.

In some embodiments, a second anterior angle 702 exists between the first line 706a and the second line 706b. In some embodiments, a second P1 704a angle exists between the second line 706b and the third line 706c. In some embodiments, a second P2 angle 704b exists between the third line 706c and the first line 706a.

Stent Frame Covering

Figure 8:
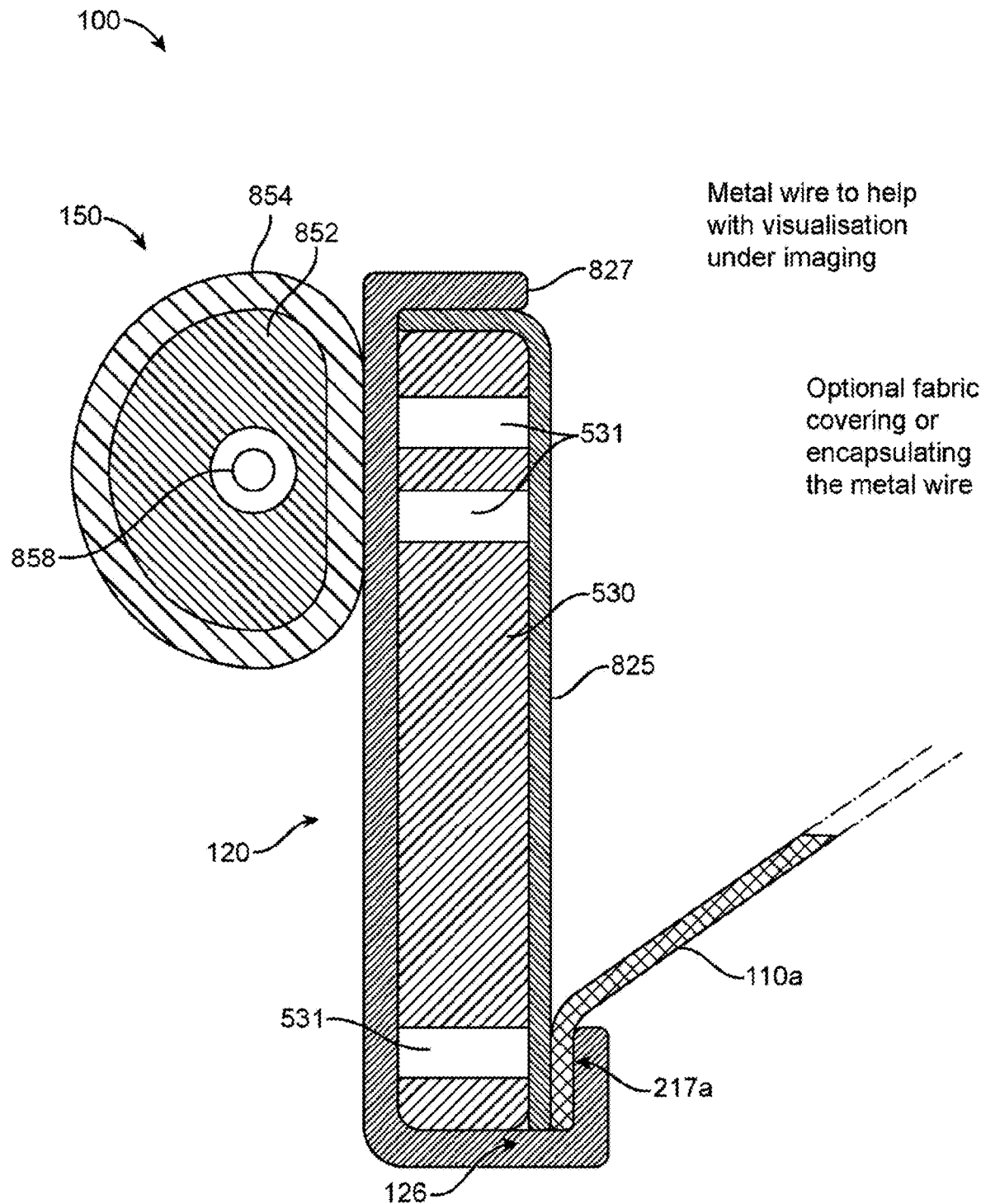
FIG. 8 is a cross-sectional view of the assembled mitral valve prosthesis device of the present disclosure taken along the indicated section lines in FIG. 2.

FIG. 8 is a cross-sectional view of the assembled mitral valve prosthesis device 100 taken along the indicated section lines in FIG. 2.

In some embodiments, the stent frame assembly 120 comprises a covering 126 disposed over the stent frame 530. In some embodiments, the covering 126 comprises an inner skirt 825 and an outer skirt 827. In some embodiments, at least one of the covering, the inner skirt, or the outer skirt comprises a fabric or pericardium tissue.

In some embodiments, the peripheral ring 150 comprises an inner fabric 852 and an outer fabric 854. In some embodiments, the peripheral ring comprises at least one of woven polyester fabric (e.g., polyethylene terepthalate or polyester), silk, polypropylene, other fiber or fabric materials, silicone, PET, or expanded PTFE. In some embodiments, the peripheral ring comprises a metal wire 858, wherein the metal wire enables visualization of the prosthesis device 100 under imaging. In some embodiments, a fabric covering encapsulates the metal wire.

In some embodiments, the fixed edge 217a of the valve leaflet 110a is attached to the stent frame 530 by passing sutures through the plurality of suture holes 531. In some embodiments, the covering 126 (e.g., the inner skirt 825 and/or the outer skirt 827) is attached to the stent frame 530 by passing sutures through the plurality of suture holes 531.

Alternative Attachment Locations of the Peripheral Ring

Figure 9A:
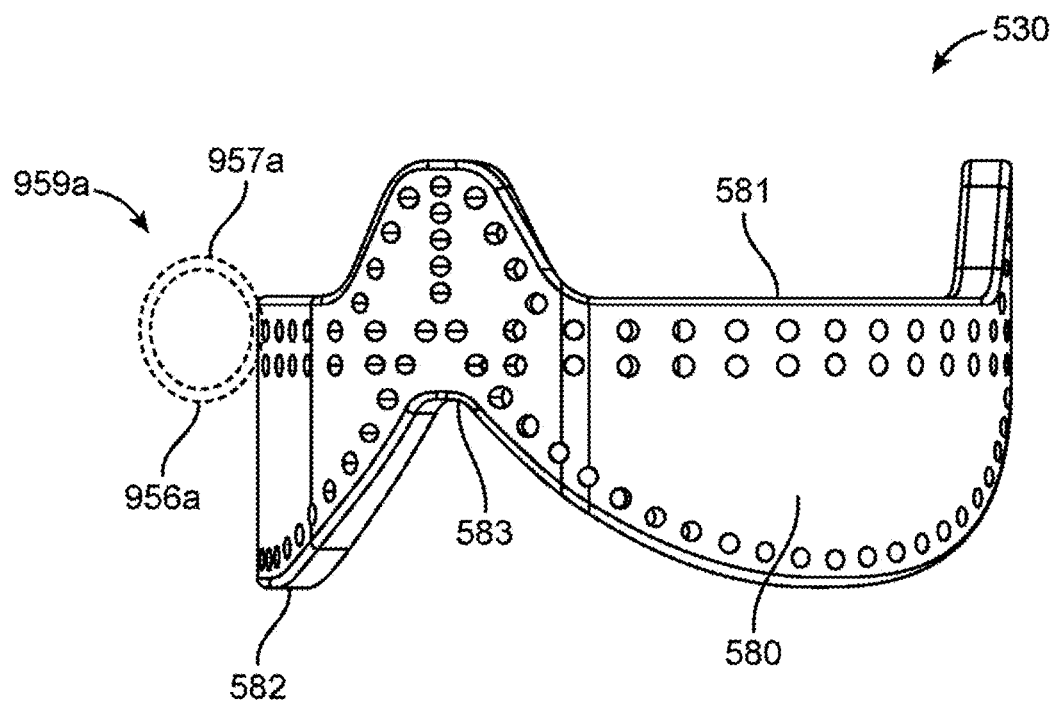
FIGS. 9A-9B are elevational views of a stent frame of an exemplary mitral valve prosthesis device of the present disclosure depicting where a peripheral ring can be attached.
Figure 9B:
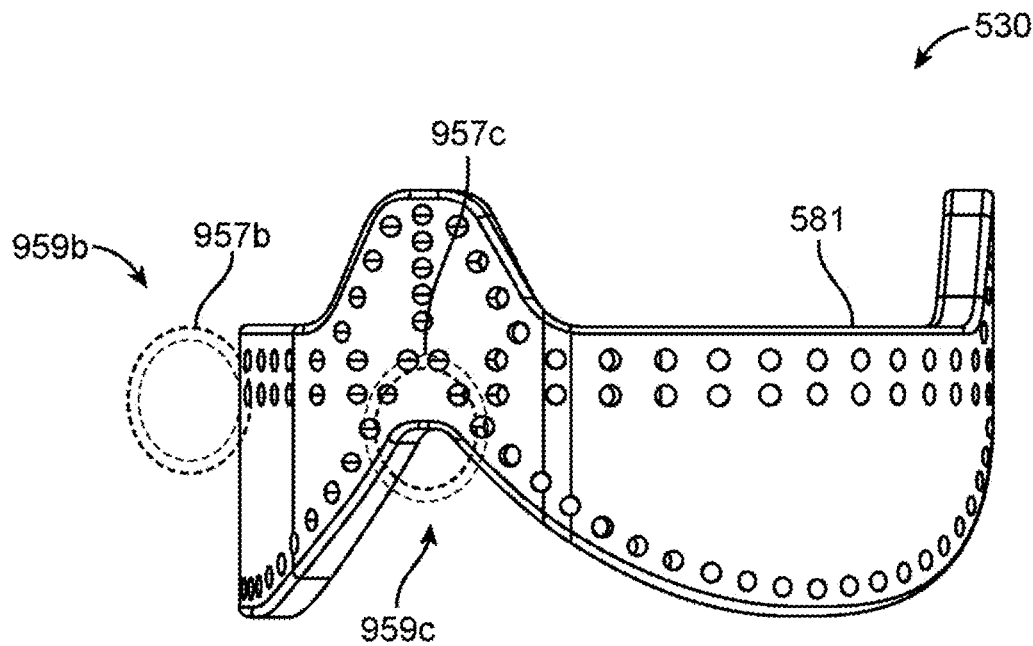

FIGS. 9A-9B are elevational views of a stent frame depicting variations for attachment locations of the peripheral ring to the stent frame. The attachment location 959a, depicted in FIG. 9A, achieves a higher degree of atrialisation compared to either attachment locations 959b and 959c, as depicted in FIG. 9B. In some embodiments, the ventricular-facing inferior-most surface 957a of the peripheral ring is positioned farther from the superior-most atrial end 582 of the cylinder 580 than is the ventricular end 581 of the cylinder. In some embodiments, the atria-facing superior-most surface 956a of the peripheral ring is approximately in horizontal alignment with a surface of the scallop tip 583.

The attachment location 959c achieves the lowest degree of atrialisation compared to the attachment locations 959a and 959b. In some embodiments, the ventricular-facing inferior-most surface 957c of the peripheral ring is positioned closer to the superior-most atrial end 582 of the cylinder 580 than is the ventricular end 581 of the cylinder.

The attachment location 959b has a degree of atrialization between attachment locations 959a and 959c. The attachment location 959b represents the "horizontal" or "flat" position of the peripheral ring, wherein the ventricular-facing inferior-most surface 957b of the peripheral ring is aligned with a horizontal surface of the ventricular end 581 of the cylinder.

Full or Partial Saddling of the Peripheral Ring

Figure 10:
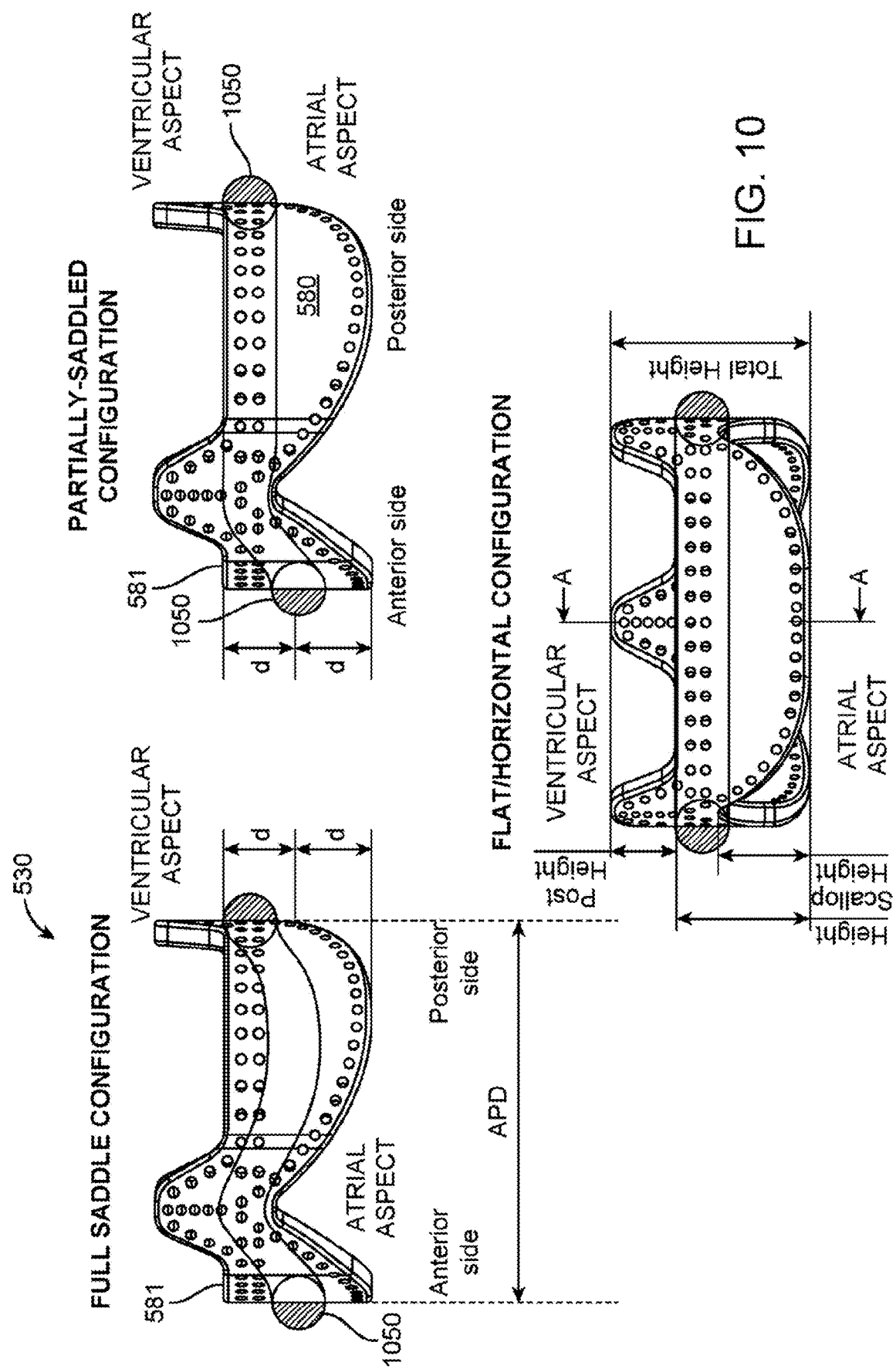
FIG. 10 depicts partial and full saddling configurations of a peripheral ring of the present disclosure.

In some embodiments, the peripheral ring has a flat (i.e., horizontal) configuration. In some embodiments, atrialisation can be achieved or improved by giving the peripheral ring a partially saddled or fully saddle configuration. In some embodiments, the peripheral ring 1050 can be saddle shaped such that the peripheral ring is closer to scallops of the atrial end of the cylinder 580 on the anterior side along the AP diameter and closer to the scallops of the atrial end of the cylinder 580 along the transverse diameter (e.g., a full saddle configuration), as depicted in FIG. 10. In some embodiments, various suture holes on the cylinder 580 can be shifted to better align with or follow a fully saddled peripheral ring 1050 on the cylinder.

In some embodiments, the peripheral ring 1050 can be saddle shaped such that the peripheral ring is closer to scallops of the atrial end of the cylinder 580 on the anterior side along the AP diameter and the peripheral ring is horizontal or flat on the posterior side of the AP diameter (e.g., a first partially saddled configuration). In some embodiments, the peripheral ring 1050 can be saddle shaped such that the peripheral ring is closer to scallops of the atrial end of the cylinder 580 on the anterior side along the AP diameter, the peripheral ring is horizontal or flat on the posterior side of the AP diameter, and the peripheral ring is also horizontal or flat along the traverse diameter (e.g., a second partially saddled configuration), as depicted in FIG. 10. In some embodiments, various suture holes on the cylinder 580 can be shifted to better align with or follow a partially saddled peripheral ring 1050 on the cylinder.

Full or partial saddling can achieve or improve atrialisation because the ventricular end 581 of the cylinder can be reverse scalloped towards the inferior-most surfaces of the peripheral ring 1050 adjacent to the ventricular end 581, thereby causing the shape of the ventricular end 581 of the cylinder to align with or follow the shape of the saddled peripheral ring 1050, and thereby causing less total area of the stent frame 530 to protrude into the ventricular chamber.

Figure 11:
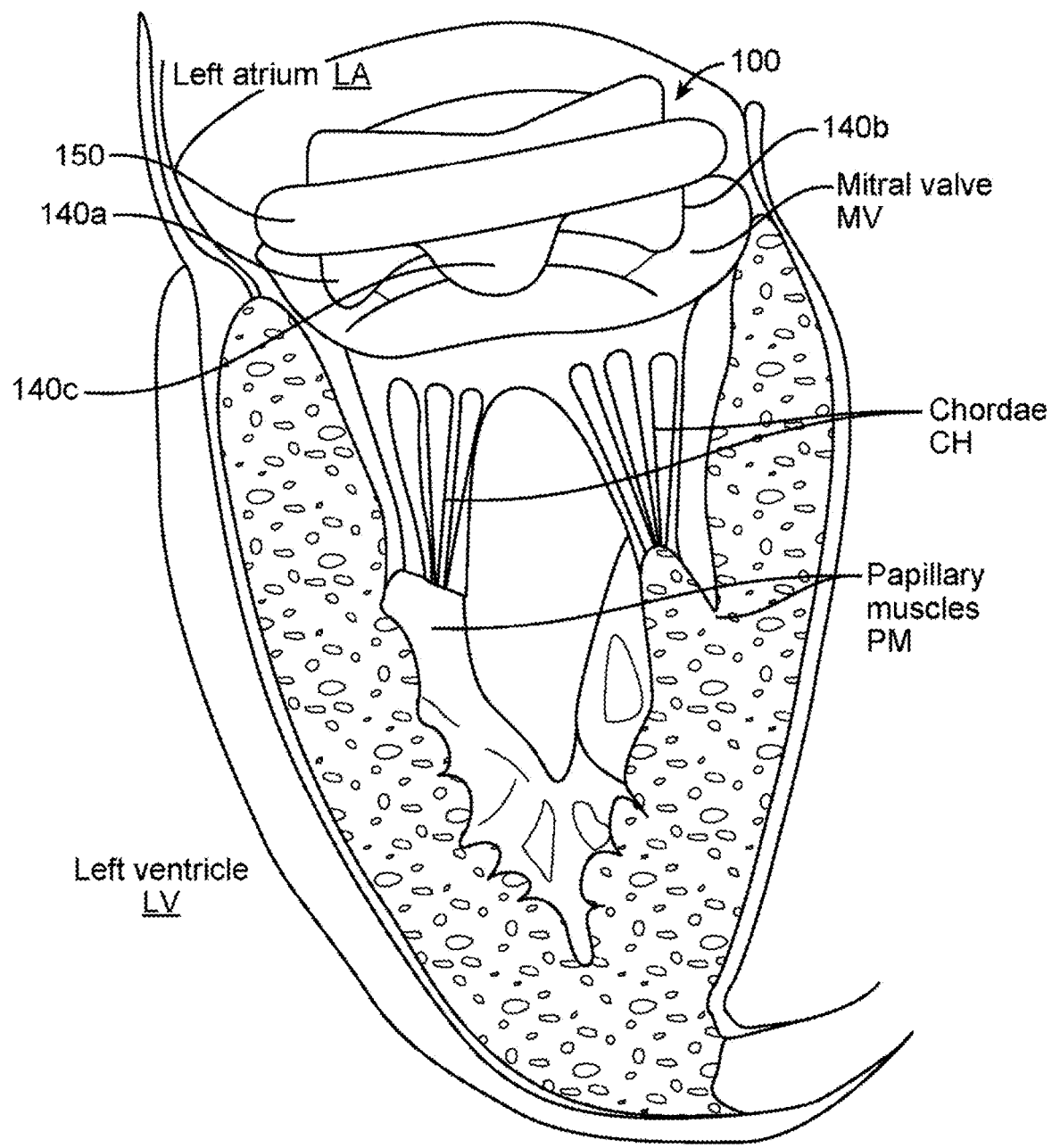
FIG. 11 depicts atrialisation of a mitral valve prosthesis device of the present disclosure achieved by placement of the prosthesis device on the native mitral valve annulus.
Figures 12A, 12B, 12C, 12D:
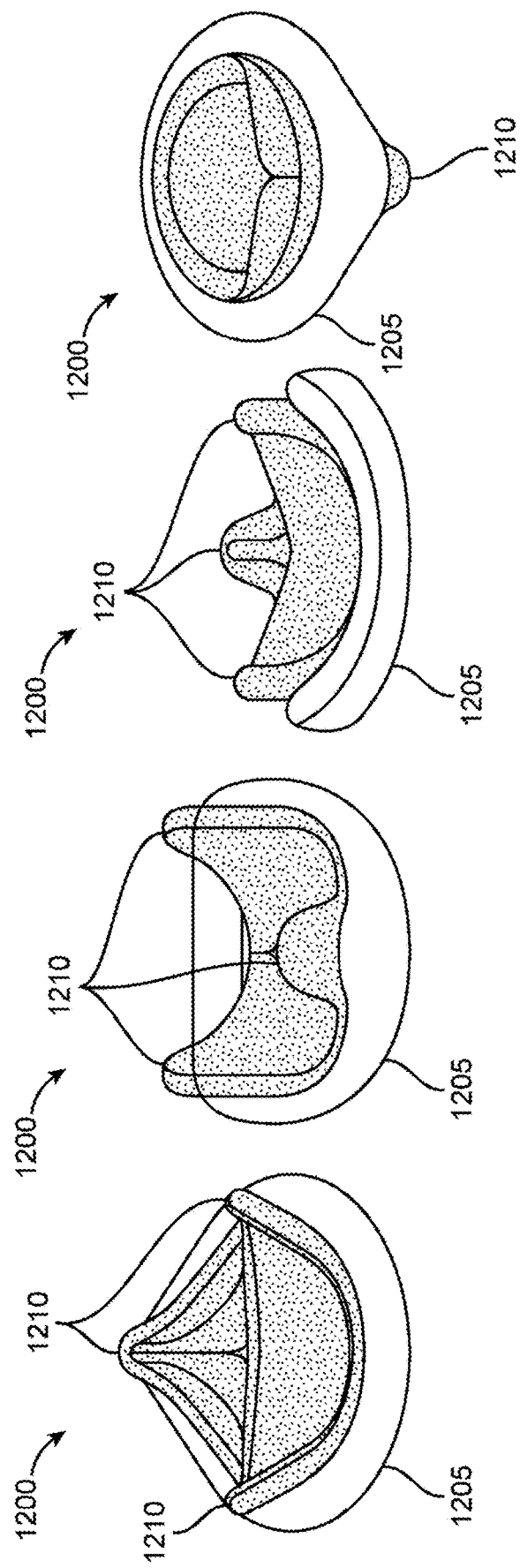
FIGS. 12A-12D are various views depicting a further embodiment of mitral valve prosthesis devices of the present disclosure, the prosthesis devices comprising a peripheral ring having scalloped edges at each ventricular post.

Atrialisation of the Mitral Valve Prosthesis Device Achieved by Implantation Method The native mitral valve separates an atrial chamber (i.e., the left atrium LA) and a ventricular chamber (i.e., the left ventricle LV) of a heart. The native mitral valve annulus has an atrial-facing side and a ventricular-facing side. In some embodiments, atrialisation can be achieved or improved by implanting the mitral valve prosthesis device on an atrial-facing side of the native mitral valve annulus. FIG. 11 depicts placement of the exemplary mitral valve prosthesis device 100 in the native mitral valve annulus MV by a method that achieves atrialisation. In some embodiments, a higher degree of atrialisation of the prosthesis device 100 is achieved by sewing the peripheral ring to the atrial-facing side of the native mitral valve annulus, as depicted in FIG. 11, thereby reducing a protrusion of the prosthesis device 100 (e.g., the plurality of ventricular posts 140a, 140b, and 140c) into the ventricular chamber. Achieving higher degrees of atrialisation can reduce an effect on ventricular outflow (e.g., LVOT obstruction) or excursion of a native leaflet caused by such protrusion because the native anterior leaflet of the native mitral valve is not displaced or is minimally displaced to below an aortic valve by the prosthesis device 100. Also, with higher degrees of atrialisation, the native anterior mitral leaflet need not be resected or modified and can therefore continue to maintain the structure of the left ventricle along with the chordae CH and papillary muscles PM, thereby maintaining their natural support to left ventricular function. Further, with higher degrees of atrialisation, an effect on excursion of a native leaflet (e.g., protrusion of the stent frame assembly into a ventricular chamber causing limited or sub-maximal excursion) will be reduced.

In some embodiments, a standard suture implant technique can be applied when implanting the prosthesis device 100, comprising sewing the peripheral ring 150 on the atrial side of the mitral valve annulus with a first suture line, and then suturing the peripheral ring to the mitral wall with a second suture line. In some embodiments, a continuous running stitch (e.g., a whip stitch) can be used for the second suture line. In some embodiments, adding the second suture line helps to cover any crevice resulting at the juncture of the sewing ring and the atrial wall or annulus, thereby further preventing risks associated with stasis and thrombogenicity.

In some embodiments, when implanting the prosthesis device 100, the first anterior post 140a and the second anterior post 140b are positioned adjacent to an anterior side of the native mitral valve annulus. In some embodiments, the posterior post 140c is positioned adjacent to a posterior side of the native mitral valve annulus.

Figure 13B:
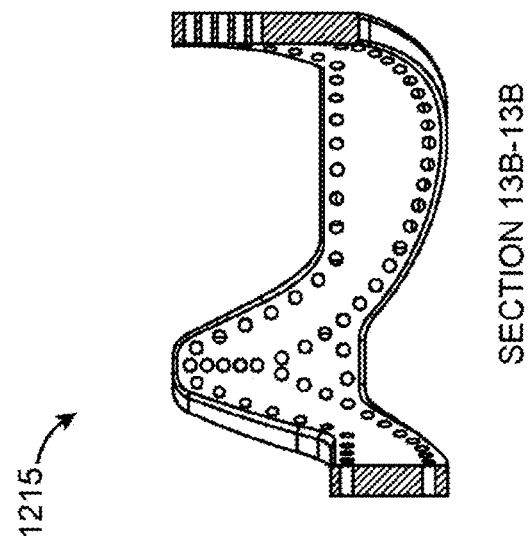
FIGS. 13A-13B depict an elevational view and a cross-sectional view, respectively, of a stent frame of an exemplary mitral valve prosthesis device of the present disclosure.
Figure 13A:
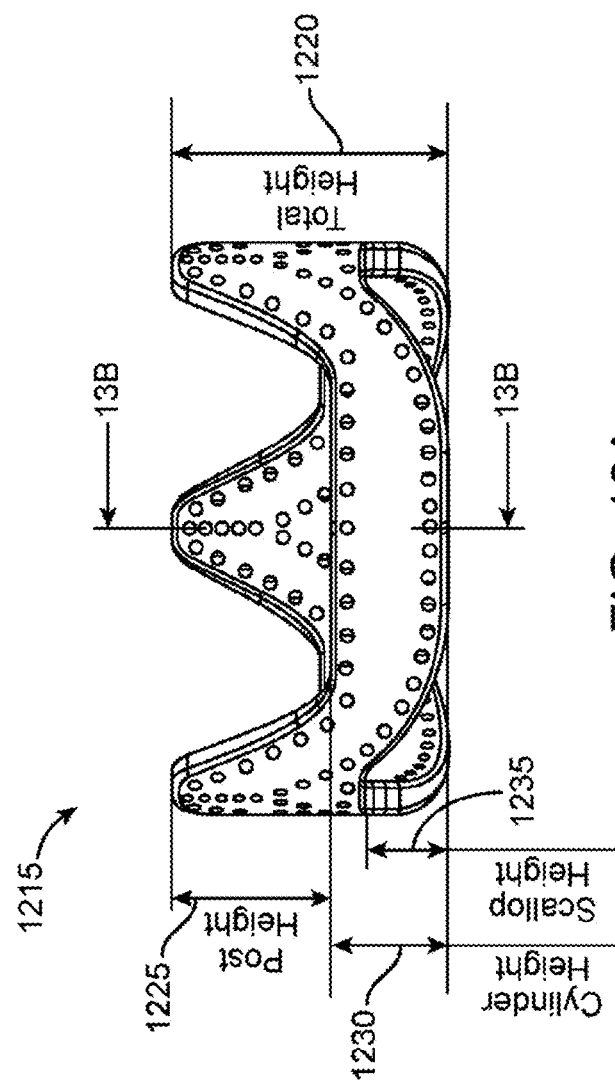

Atrialisation of the Mitral Valve Prosthesis Device Achieved by Scalloping the Peripheral Ring FIGS. 12A-12D are various views depicting an alternative version of atrialisation wherein an exemplary mitral valve prosthesis device 1200 of the present disclosure comprises a peripheral ring 1205 with scalloping towards the ventricular-facing ends 1210 of the plurality of ventricular posts. FIGS. 13A-13B depict an elevational view and a cross-sectional view, respectively, of a stent frame 1215 of the exemplary mitral valve prosthesis device 1200 depicted in FIGS. 12A-12D. FIG. 13A shows a total height 1220, post height 1225, cylinder height 1230, and scallop height 1235 of the stent frame. FIG. 13B shows a section view of the stent frame 1215 taken along the line 13B in FIG. 13A.

In some embodiments, atrialisation is achieved by altering ratios of the cylinder height to the total height compared to the previously shown embodiments. In some embodiments, the sewing ring is scalloped in the ventricular direction along each ventricular post of the stent frame assembly. Such scalloping significantly reduces the ventricular length of the stent frame assembly, thereby reducing protrusion of the stent frame assembly into the ventricular chamber. In some embodiments, the inferior-most surface of the peripheral ring can be measured from a scalloped portion of the peripheral ring.

The devices described herein can be applicable for other cardiac valves, such as the tricuspid valve. In some embodiments, the cardiac valve prosthesis device is configured to augment, support, or improve the function of a native tricuspid valve when the prosthesis device is implanted in the native tricuspid valve.

While preferred embodiments of the present disclosure have been shown and described herein, it will be obvious to those skilled in the art that such embodiments are provided by way of example only. It is not intended that the present disclosure be limited by the specific examples provided within the specification. While the embodiments of the present disclosure have been described with reference to the aforementioned specification, the descriptions and illustrations of the embodiments herein are not meant to be construed in a limiting sense. Numerous variations, changes, and substitutions will now occur to those skilled in the art without departing from the scope of the present disclosure. Furthermore, it shall be understood that all aspects of the present disclosure are not limited to the specific depictions, configurations or relative proportions set forth herein which depend upon a variety of conditions and variables. It should be understood that various alternatives to the embodiments of the present disclosure described herein may be employed in practicing the embodiments of the present disclosure. It is therefore contemplated that the present disclosure shall also cover any such alternatives, modifications, variations, or equivalents. It is intended that the following claims define the scope of invention and that methods and structures within the scope of these claims and their equivalents be covered thereby.

What is claimed:

1. A cardiac valve prosthesis device comprising:
a stent frame assembly having an atrial portion including an atria-facing superior end, a ventricular portion including a ventricular-facing inferior end, a height between the superior end and the inferior end, a central opening traversing between the atrial and ventricular portions;
a peripheral ring attached to the stent frame assembly and surrounding the central opening, wherein the peripheral ring is disposed between the atrial and ventricular portions, wherein the peripheral ring has a ventricular-facing inferior-most surface configured to fit over a native cardiac valve annulus when the prosthesis device is implanted in a native cardiac valve; and
a plurality of valve leaflets fixedly coupled to the stent frame assembly and positioned at the central opening of the stent frame assembly,
wherein the peripheral ring limits protrusion of the stent frame assembly into a ventricular chamber so that an effect on ventricular outflow or excursion of a native leaflet by such protrusion is reduced, wherein the cardiac valve prosthesis device is configured to augment the native cardiac valve, and
wherein a ventricular length between the inferior-most surface of the peripheral ring and the inferior end of the stent frame assembly is:
(a) less than 50% of the height between the inferior end and the superior end of the stent frame assembly,
(b) 8 mm or less, or
(a) and (b).

2. The cardiac valve prosthesis device of claim 1, wherein the native cardiac valve is a mitral valve.

3. The cardiac valve prosthesis device of claim 1, wherein a ventricular length between the inferior-most surface of the peripheral ring and the inferior end of the stent frame assembly is less than 33% of the height between the inferior end and the superior end of the stent frame assembly.

4. The cardiac valve prosthesis device of claim 1, wherein a ventricular length between the inferior-most surface of the peripheral ring and the inferior end of the stent frame assembly is 5 mm or less.

5. The cardiac valve prosthesis device of claim 1, wherein an atrial length between the inferior-most surface of the peripheral ring and the superior end of the stent frame assembly is more than 50% of the height between the inferior end and the superior end of the stent frame assembly.

6. The cardiac valve prosthesis device of claim 5, wherein an atrial length between the inferior-most surface of the peripheral ring and the superior end of the stent frame assembly is more than 66% of the height between the inferior end and the superior end of the stent frame assembly.

7. The cardiac valve prosthesis device of claim 1, wherein the atrial portion has a height between 6 mm and 14 mm.

8. The cardiac valve prosthesis device of claim 1, wherein the ventricular portion has a height between 1.5 mm and 10 mm.

9. The cardiac valve prosthesis device of claim 1, wherein the peripheral ring is shaped to match a shape of the native cardiac valve annulus so as to fit thereon when the prosthesis device is implanted in the native cardiac valve.

10. The cardiac valve prosthesis device of claim 1, wherein the stent frame assembly has an antero-posterior diameter and a transverse diameter, the antero-posterior diameter being smaller than the transverse diameter.

11. The cardiac valve prosthesis device of claim 1, wherein the stent frame assembly has an anterior edge, a first posterior edge, and a second posterior edge, and wherein the anterior edge is one or more of flatter or longer than each of the first and second posterior edges, wherein the anterior edge, the first posterior edge, and the second posterior edge of the stent frame assembly are defined by the peripheral ring.

12. The cardiac valve prosthesis device of claim 1, wherein the stent frame assembly has an antero-posterior diameter between 20 mm and 34 mm.

13. The cardiac valve prosthesis device of claim 1, wherein the stent frame assembly has a transverse diameter between 25 mm and 39 mm.

14. The cardiac valve prosthesis device of claim 1, wherein the stent frame assembly is non-circular shaped.

15. The cardiac valve prosthesis device of claim 14, wherein the stent frame assembly is approximately D-shaped.

16. The cardiac valve prosthesis device of claim 1, wherein the peripheral ring comprises an anterior edge, a first posterior edge, and a second posterior edge, each sized and shaped to match complementary portions of the native cardiac valve annulus.

17. The cardiac valve prosthesis device of claim 1, wherein the stent frame assembly comprises an asymmetric cylinder and a plurality of ventricular posts extending therefrom.

18. The cardiac valve prosthesis device of claim 17, wherein the peripheral ring further comprises a first anterior corner, a second anterior corner, and a posterior corner, and wherein the plurality of ventricular posts comprises a first anterior post positioned at the first anterior corner, a second anterior post positioned at the second anterior corner, and a posterior post positioned at the posterior corner.

19. The cardiac valve prosthesis device of claim 1, wherein the peripheral ring is a sewing ring.

20. The cardiac valve prosthesis device of claim 1, wherein the peripheral ring is flexible in the plane of the native cardiac valve annulus.

21. The cardiac valve prosthesis device of claim 20, wherein the peripheral ring is more flexible in the plane of the native cardiac valve annulus than in a plane transverse to the plane of the native cardiac valve annulus.

22. The cardiac valve prosthesis device of claim 1, wherein the plurality of valve leaflets comprises an anterior valve leaflet, a first posterior valve leaflet, and a second posterior valve leaflet, each comprising fixed edges coupled to the stent frame assembly and free edges.

23. The cardiac valve prosthesis device of claim 22, wherein the anterior valve leaflet is larger than each of the first and second posterior valve leaflets.

24. The cardiac valve prosthesis device of claim 22, wherein the stent frame assembly comprises a plurality of ventricular posts, the plurality of ventricular posts comprising a first anterior post, a second anterior post, and a posterior post.

25. The cardiac valve prosthesis device of claim 24, wherein a fixed edge of the anterior valve leaflet is supported by the first and second anterior posts, and wherein a distance between the first and second anterior posts is greater than distances between each anterior post and the posterior post.

26. A cardiac valve prosthesis device comprising:
a stent frame assembly having an atrial portion including an atria-facing superior end, a ventricular portion including a ventricular-facing inferior end, a height between the superior end and the inferior end, a central opening traversing between the atrial and ventricular portions;
a peripheral ring attached to the stent frame assembly and surrounding the central opening, wherein the peripheral ring is disposed between the atrial and ventricular portions, wherein the peripheral ring has a ventricular-facing inferior-most surface configured to fit over a native cardiac valve annulus when the prosthesis device is implanted in a native cardiac valve; and
a plurality of valve leaflets fixedly coupled to the stent frame assembly and positioned at the central opening of the stent frame assembly,
wherein the peripheral ring limits protrusion of the stent frame assembly into a ventricular chamber so that an effect on ventricular outflow or excursion of a native leaflet by such protrusion is reduced,
wherein the cardiac valve prosthesis device is configured to augment the native cardiac valve, and
wherein an atrial length between the inferior-most surface of the peripheral ring and the superior end of the stent frame assembly is more than 50% of the height between the inferior end and the superior end of the stent frame assembly.

27. The cardiac valve prosthesis device of claim 26, wherein the native cardiac valve is a mitral valve.

28. The cardiac valve prosthesis device of claim 26, wherein the peripheral ring is shaped to match a shape of the native cardiac valve annulus so as to fit thereon when the prosthesis device is implanted in the native cardiac valve.

29. The cardiac valve prosthesis device of claim 26, wherein the stent frame assembly has an antero-posterior diameter and a transverse diameter, the antero-posterior diameter being smaller than the transverse diameter.

30. The cardiac valve prosthesis device of claim 26, wherein the stent frame assembly is non-circular shaped.

31. The cardiac valve prosthesis device of claim 26, wherein the peripheral ring comprises an anterior edge, a first posterior edge, and a second posterior edge, each sized and shaped to match complementary portions of the native cardiac valve annulus.

32. The cardiac valve prosthesis device of claim 26, wherein the stent frame assembly comprises an asymmetric cylinder and a plurality of ventricular posts extending therefrom.

33. The cardiac valve prosthesis device of claim 26, wherein the peripheral ring is flexible in the plane of the native cardiac valve annulus.

34. The cardiac valve prosthesis device of claim 26, wherein the plurality of valve leaflets comprises an anterior valve leaflet, a first posterior valve leaflet, and a second posterior valve leaflet, each comprising fixed edges coupled to the stent frame assembly and free edges.

35. A cardiac valve prosthesis device comprising:
a stent frame assembly having an atrial portion including an atria-facing superior end, a ventricular portion including a ventricular-facing inferior end, a height between the superior end and the inferior end, a central opening traversing between the atrial and ventricular portions;
a peripheral ring attached to the stent frame assembly and surrounding the central opening, wherein the peripheral ring is disposed between the atrial and ventricular portions, wherein the peripheral ring has a ventricular-facing inferior-most surface configured to fit over a native cardiac valve annulus when the prosthesis device is implanted in a native cardiac valve; and
a plurality of valve leaflets fixedly coupled to the stent frame assembly and positioned at the central opening of the stent frame assembly,
wherein the peripheral ring limits protrusion of the stent frame assembly into a ventricular chamber so that an effect on ventricular outflow or excursion of a native leaflet by such protrusion is reduced,
wherein the cardiac valve prosthesis device is configured to augment the native cardiac valve, and
wherein:
(a) the atrial portion has a height between 6 mm and 14 mm,
(b) the ventricular portion has a height between 1.5 mm and 10 mm, or
(a) and (b).

36. The cardiac valve prosthesis device of claim 35, wherein the native cardiac valve is a mitral valve.

37. The cardiac valve prosthesis device of claim 35, wherein the peripheral ring is shaped to match a shape of the native cardiac valve annulus so as to fit thereon when the prosthesis device is implanted in the native cardiac valve.

38. The cardiac valve prosthesis device of claim 35, wherein the stent frame assembly has an antero-posterior diameter and a transverse diameter, the antero-posterior diameter being smaller than the transverse diameter.

39. The cardiac valve prosthesis device of claim 35, wherein the stent frame assembly is non-circular shaped.

40. The cardiac valve prosthesis device of claim 35, wherein the peripheral ring comprises an anterior edge, a first posterior edge, and a second posterior edge, each sized and shaped to match complementary portions of the native cardiac valve annulus.

41. The cardiac valve prosthesis device of claim 35, wherein the stent frame assembly comprises an asymmetric cylinder and a plurality of ventricular posts extending therefrom.

42. The cardiac valve prosthesis device of claim 35, wherein the peripheral ring is flexible in the plane of the native cardiac valve annulus.

43. The cardiac valve prosthesis device of claim 35, wherein the plurality of valve leaflets comprises an anterior valve leaflet, a first posterior valve leaflet, and a second posterior valve leaflet, each comprising fixed edges coupled to the stent frame assembly and free edges.

44. A cardiac valve prosthesis device comprising:
a stent frame assembly having an atrial portion including an atria-facing superior end, a ventricular portion including a ventricular-facing inferior end, a height between the superior end and the inferior end, a central opening traversing between the atrial and ventricular portions;
a peripheral ring attached to the stent frame assembly and surrounding the central opening, wherein the peripheral ring is disposed between the atrial and ventricular portions, wherein the peripheral ring has a ventricular-facing inferior-most surface configured to fit over a native cardiac valve annulus when the prosthesis device is implanted in a native cardiac valve; and
a plurality of valve leaflets fixedly coupled to the stent frame assembly and positioned at the central opening of the stent frame assembly,
wherein the peripheral ring limits protrusion of the stent frame assembly into a ventricular chamber so that an effect on ventricular outflow or excursion of a native leaflet by such protrusion is reduced,
wherein the cardiac valve prosthesis device is configured to augment the native cardiac valve, and
wherein the stent frame assembly has an anterior edge, a first posterior edge, and a second posterior edge, and wherein the anterior edge is one or more of flatter or longer than each of the first and second posterior edges, wherein the anterior edge, the first posterior edge, and the second posterior edge of the stent frame assembly are defined by the peripheral ring.

45. The cardiac valve prosthesis device of claim 44, wherein the native cardiac valve is a mitral valve.

46. The cardiac valve prosthesis device of claim 44, wherein the peripheral ring is shaped to match a shape of the native cardiac valve annulus so as to fit thereon when the prosthesis device is implanted in the native cardiac valve.

47. The cardiac valve prosthesis device of claim 44, wherein the stent frame assembly has an antero-posterior diameter and a transverse diameter, the antero-posterior diameter being smaller than the transverse diameter.

48. The cardiac valve prosthesis device of claim 44, wherein the stent frame assembly is non-circular shaped.

49. The cardiac valve prosthesis device of claim 44, wherein the peripheral ring comprises an anterior edge, a first posterior edge, and a second posterior edge, each sized and shaped to match complementary portions of the native cardiac valve annulus.

50. The cardiac valve prosthesis device of claim 44, wherein the stent frame assembly comprises an asymmetric cylinder and a plurality of ventricular posts extending therefrom.

51. The cardiac valve prosthesis device of claim 44, wherein the peripheral ring is flexible in the plane of the native cardiac valve annulus.

52. The cardiac valve prosthesis device of claim 44, wherein the plurality of valve leaflets comprises an anterior valve leaflet, a first posterior valve leaflet, and a second posterior valve leaflet, each comprising fixed edges coupled to the stent frame assembly and free edges.

53. A cardiac valve prosthesis device comprising:
- a stent frame assembly having an atrial portion including an atria-facing superior end, a ventricular portion including a ventricular-facing inferior end, a height between the superior end and the inferior end, a central opening traversing between the atrial and ventricular portions;
- a peripheral ring attached to the stent frame assembly and surrounding the central opening, wherein the peripheral ring is disposed between the atrial and ventricular portions, wherein the peripheral ring has a ventricular-facing inferior-most surface configured to fit over a native cardiac valve annulus when the prosthesis device is implanted in a native cardiac valve; and
- a plurality of valve leaflets fixedly coupled to the stent frame assembly and positioned at the central opening of the stent frame assembly,
- wherein the peripheral ring limits protrusion of the stent frame assembly into a ventricular chamber so that an effect on ventricular outflow or excursion of a native leaflet by such protrusion is reduced,
- wherein the cardiac valve prosthesis device is configured to augment the native cardiac valve, and wherein:
- (a) the stent frame assembly has an antero-posterior diameter between 20 mm and 34 mm,
- (b) the stent frame assembly has a transverse diameter between 25 mm and 39 mm, or
- (a) and (b).

54. The cardiac valve prosthesis device of claim 53, wherein the native cardiac valve is a mitral valve.

55. The cardiac valve prosthesis device of claim 53, wherein the peripheral ring is shaped to match a shape of the native cardiac valve annulus so as to fit thereon when the prosthesis device is implanted in the native cardiac valve.

56. The cardiac valve prosthesis device of claim 53, wherein the stent frame assembly has an antero-posterior diameter and a transverse diameter, the antero-posterior diameter being smaller than the transverse diameter.

57. The cardiac valve prosthesis device of claim 53, wherein the stent frame assembly is non-circular shaped.

58. The cardiac valve prosthesis device of claim 53, wherein the peripheral ring comprises an anterior edge, a first posterior edge, and a second posterior edge, each sized and shaped to match complementary portions of the native cardiac valve annulus.

59. The cardiac valve prosthesis device of claim 53, wherein the stent frame assembly comprises an asymmetric cylinder and a plurality of ventricular posts extending therefrom.

60. The cardiac valve prosthesis device of claim 53, wherein the peripheral ring is flexible in the plane of the native cardiac valve annulus.

61. The cardiac valve prosthesis device of claim 53, wherein the plurality of valve leaflets comprises an anterior valve leaflet, a first posterior valve leaflet, and a second posterior valve leaflet, each comprising fixed edges coupled to the stent frame assembly and free edges.

\* \* \* \* \*